(12) United States Patent
Shim et al.

(10) Patent No.: US 11,265,489 B2
(45) Date of Patent: Mar. 1, 2022

(54) IMAGE SENSORS INCLUDING PIXEL GROUPS AND ELECTRONIC DEVICES INCLUDING IMAGE SENSORS

(71) Applicant: Samsung Electronics Co., Ltd., Suwon-si (KR)

(72) Inventors: Eunsub Shim, Hwaseong-si (KR); Seyoung Kim, Suwon-si (KR); Sanghyuck Moon, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 17/326,587

(22) Filed: May 21, 2021

(65) Prior Publication Data
US 2021/0281782 A1 Sep. 9, 2021

Related U.S. Application Data

(63) Continuation of application No. 16/841,796, filed on Apr. 7, 2020, now Pat. No. 11,044,427.

(30) Foreign Application Priority Data

Apr. 8, 2019 (KR) .................. 10-2019-0041057

(51) Int. Cl.
*H04N 5/355* (2011.01)
(52) U.S. Cl.
CPC .............................. *H04N 5/3559* (2013.01)
(58) Field of Classification Search
CPC .. H04N 5/3559; H04N 5/37457; H04N 5/378; H01L 27/14603
See application file for complete search history.

(56) References Cited

U.S. PATENT DOCUMENTS

| 7,432,540 | B2 | 10/2008 | McKee |
| 7,728,896 | B2 | 6/2010 | McKee |
| 9,247,170 | B2 | 1/2016 | Komori et al. |
| 9,467,633 | B2 | 10/2016 | Johnson et al. |
| 9,936,153 | B1 | 4/2018 | Mao et al. |
| 2005/0128327 | A1* | 6/2005 | Bencuya ........... H01L 27/14643 348/308 |
| 2006/0256221 | A1* | 11/2006 | Mckee ............. H01L 27/14641 348/308 |
| 2006/0273240 | A1* | 12/2006 | Guidash ............. H04N 5/37457 250/208.1 |

(Continued)

*Primary Examiner* — Chiawei Chen
(74) *Attorney, Agent, or Firm* — Harness, Dickey & Pierce, P.L.C.

(57) ABSTRACT

An image sensor includes first photodiodes sharing a first node that is connected to a first capacitor, second photodiodes sharing a second node that is connected to a second capacitor, a common transistor configured to selectively connect a third node to a pixel voltage node, the third node connected to a third capacitor, a first reset transistor that may selectively connect the first node to the third node, and a second reset transistor that may selectively connect the second node to the third node. The first reset transistor and the second reset transistor may electrically connect the first node, the second node, and the third node to each other according to an operation of the first reset transistor and the second reset transistor. The common transistor is configured to reset the third node to the pixel voltage according to an operation of the common transistor.

20 Claims, 18 Drawing Sheets

(56) References Cited

U.S. PATENT DOCUMENTS

| | | | |
|---|---|---|---|
| 2006/0284177 A1* | 12/2006 | Hynecek | H01L 27/14641 257/59 |
| 2008/0018764 A1* | 1/2008 | Mizoguchi | H04N 5/37457 348/308 |
| 2009/0090845 A1* | 4/2009 | Yin | H04N 5/37457 250/208.1 |
| 2012/0037788 A1* | 2/2012 | Oh | H01L 27/14645 250/208.1 |
| 2015/0172579 A1* | 6/2015 | Manabe | H01L 27/14641 250/208.1 |
| 2015/0312491 A1 | 10/2015 | Egawa | |
| 2018/0278875 A1* | 9/2018 | Rotte | H01L 27/14603 |
| 2019/0237496 A1* | 8/2019 | Kwag | H04N 5/3745 |
| 2019/0363119 A1* | 11/2019 | Kwag | H01L 27/14643 |
| 2020/0322553 A1* | 10/2020 | Shim | H04N 5/3559 |

\* cited by examiner

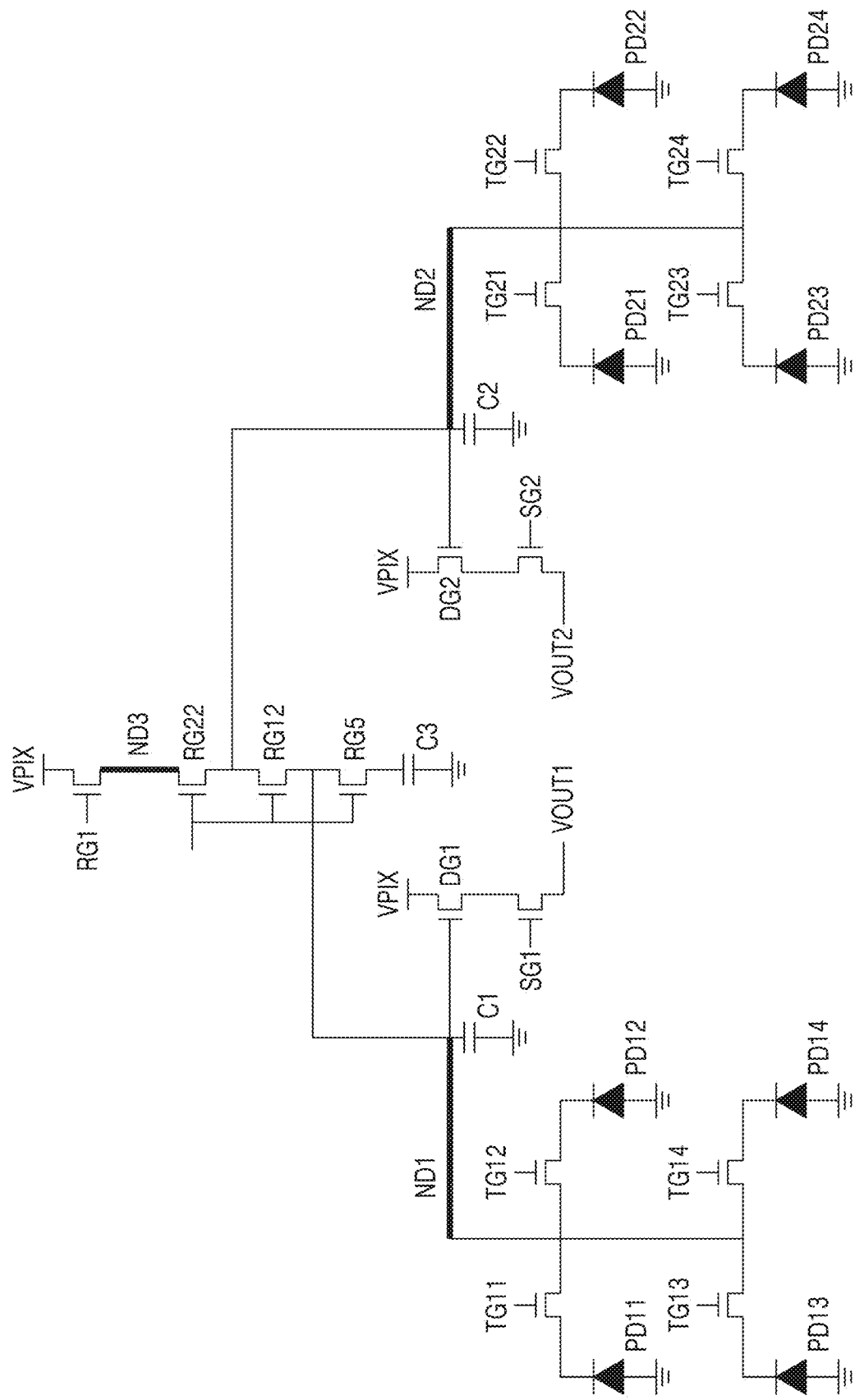

IMAGE SENSORS INCLUDING PIXEL GROUPS AND ELECTRONIC DEVICES INCLUDING IMAGE SENSORS

CROSS-REFERENCE TO RELATED APPLICATIONS

This application is a continuation of U.S. application Ser. No. 16/841,796, filed Apr. 7, 2020, which claims the benefit of Korean Patent Application No. 10-2019-0041057, filed on Apr. 8, 2019, in the Korean Intellectual Property Office, the disclosure of each of which is incorporated herein in its entirety by reference.

BACKGROUND

The inventive concepts relate to image sensors, and more particularly, to image sensors including pixel groups.

Image sensors may convert one or more optical signals received at the image sensors, where the one or more optical signals may include information associated with one or more images of one or more subjects, into one or more electrical signals. Charge-coupled device (CCD) image sensors and complementary metal oxide semiconductor (CMOS) image sensors are widely used as image sensors. Recently, in accordance to the development of the computer industry and the communication industry, the demand for image sensors having improved performance in various electronic devices such as digital cameras, camcorders, personal communication systems (PCSs), game devices, security cameras, medical micro cameras, mobile phones, or the like is increasing.

Image sensors may have increased resolution based on including a larger quantity of pixels. A plurality of photodiodes (PDs) may share one node to a larger number (e.g., quantity) of pixels. In accordance to the physical sizes of other elements (for example, a plurality of transistors, a capacitor, and a metal contact connecting the plurality of transistors and the capacitor) and the limitation of the design rule, the miniaturization of the pixels is difficult.

SUMMARY

The inventive concepts provide image sensors that have reduced complexity of a layout that more efficiently utilize chip space in the image sensors and are configured to support a dual conversion gain (DCG) function even when small-sized pixels are included in the image sensors. Accordingly, compactness of the image sensors having said reduced complexity may be improved, thereby enabling the image sensors to be included in smaller devices and/or to enable additional elements to be included in space, in the devices, that is made available due to the improved compactness of the image sensors, thereby enabling the devices to have increased functionality, performance, etc.

According to some example embodiments, an image sensor may include a plurality of first photodiodes sharing a first node, the first node connected to a first capacitor, a plurality of second photodiodes sharing a second node, the second node connected to a second capacitor, a common transistor configured to selectively connect a third node to a pixel voltage node, the third node connected to a third capacitor, a first reset transistor configured to selectively connect the first node to the third node, and a second reset transistor configured to selectively connect the second node to the third node. The first reset transistor and the second reset transistor may be collectively configured to selectively electrically connect the first node, the second node, and the third node to each other according to an operation of the first reset transistor and the second reset transistor. The common transistor may be configured to reset the third node to a pixel voltage according to an operation of the common transistor.

According to some example embodiments, an image sensor may include a plurality of first photodiodes sharing a first node, the first node connected to a first capacitor, a plurality of second photodiodes sharing a second node, the second node connected to a second capacitor, a first reset transistor configured to selectively connect the first node to the second node, a second reset transistor configured to selectively connect the second node to a third node, and a common transistor configured to selectively connect the third node to a pixel voltage node. The third node may include an electrical connection with a third capacitor.

According to some example embodiments, an electronic device may include an image sensor. The image sensor may include a plurality of first photodiodes sharing a first node, the first node connected to a first capacitor, a plurality of second photodiodes sharing a second node, the second node connected to a second capacitor, a common transistor configured to selectively connect a third node to a pixel voltage node, the third node connected to a third capacitor, a first reset transistor configured to selectively connect the first node to the third node, and a second reset transistor configured to selectively connect the second node to the third node. The first reset transistor and the second reset transistor may be collectively configured to selectively electrically connect first node, the second node, and the third node to each other according to an operation of the first reset transistor and the second reset transistor. The common transistor may be configured to reset the third node to a pixel voltage according to an operation of the common transistor.

BRIEF DESCRIPTION OF THE DRAWINGS

Example embodiments of the inventive concepts will be more clearly understood from the following detailed description taken in conjunction with the accompanying drawings in which:

FIGS. 9A and 9B respectively illustrate a circuit diagram in which a first pixel group and a second pixel group share transistors and voltage nodes according to some example embodiments of the inventive concepts;

DETAILED DESCRIPTION

Hereinafter, some example embodiments of the inventive concepts will now be described in detail with reference to the accompanying drawings.

Figure 1:
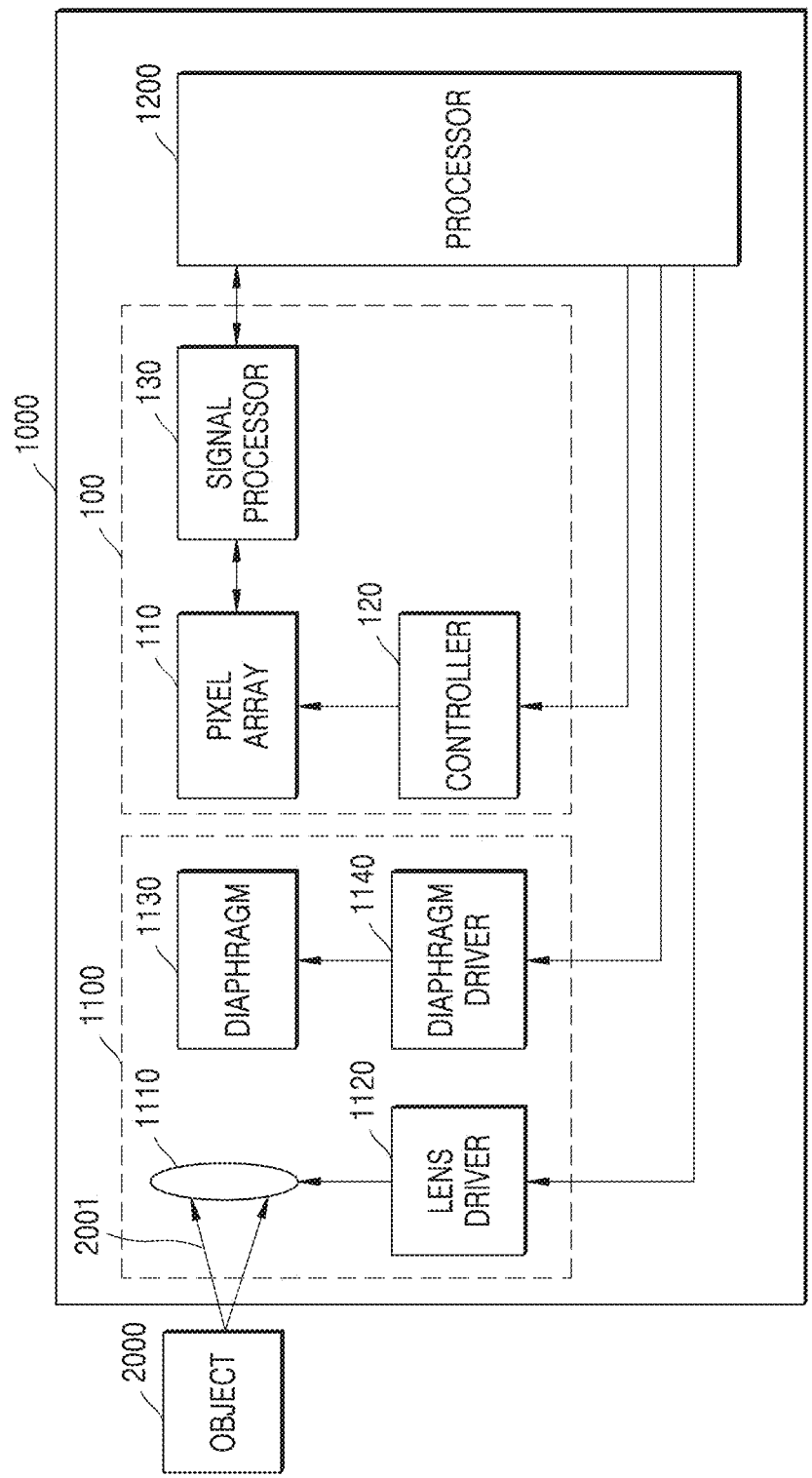
FIG. 1 illustrates an example structure of a digital imaging device according to some example embodiments of the inventive concepts.

FIG. 1 illustrates an example structure of a digital imaging device 1000 according to some example embodiments.

The digital imaging device 1000 according to some example embodiments may include an image generator 1100, an image sensor 100, and a processor 1200.

An overall operation of the digital image generator 1000 may be controlled by the processor 1200. The processor 1200 may provide (e.g., transmit) a control signal to a lens driver 1120, a diaphragm driver 1140, a controller 120, or the like to operate each element.

The processor 1200 may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The image generator 1100 is an element (e.g., device) configured to receive light 2001 (e.g., incident light from an exterior of the digital imaging device 1000) and may include a lens 1110, the lens driver 1120, a diaphragm 1130, and the diaphragm driver 1140. The lens 1110 may include a plurality of lenses.

The lens driver 1120 may adjust a position of the lens 1110 according to the control signal provided from the processor 1200. The lens driver 1120 may move the lens 1110 in a direction in which a distance from an object 2000 increases or decreases. Therefore, the distance between the lens 1110 and the object 2000 may be adjusted. A focus with respect to the object 2000 may be taken or blurred depending on the position of the lens 1110.

The image sensor 100 may convert incident light 2001 into an image signal. The image sensor 100 may include a pixel array 110, the controller 120 and a signal processor 130. An optical signal through the lens 1110 and the diaphragm 1130 may reach a light-receiving surface of the pixel array 110 and form an image of a subject.

The controller 120 and the signal processor 130 may each include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The pixel array 110 may be a complementary metal oxide semiconductor image sensor (CIS) converting an optical signal into an electrical signal. The sensitivity of the pixel array 110 may be adjusted by the controller 120. For example, the pixel array 110 may include a pixel group supporting a dual conversion gain (DCG).

According to some example embodiments, the processor 1200 may use surrounding luminance information to determine to operate in a low conversion gain (LCG) mode or a high conversion gain (HCG) mode. For example, when the surrounding (e.g., ambient environment external to the digital imaging device 1000) is bright, an operation is performed in the LCG mode. When the surrounding is dark, an operation is performed in the HCG mode such that an ability to identify objects may be improved.

According to some example embodiments, the processor 1200 may reduce noise of an input signal and perform an image signal processing for improving image quality such as gamma correction, color filter array interpolation, color matrix, color correction, color enhancement, or the like. In addition, image data generated by processing the image signal for improving the image quality may be compressed to generate an image file or the image data may be recovered from the image file.

Figure 2:
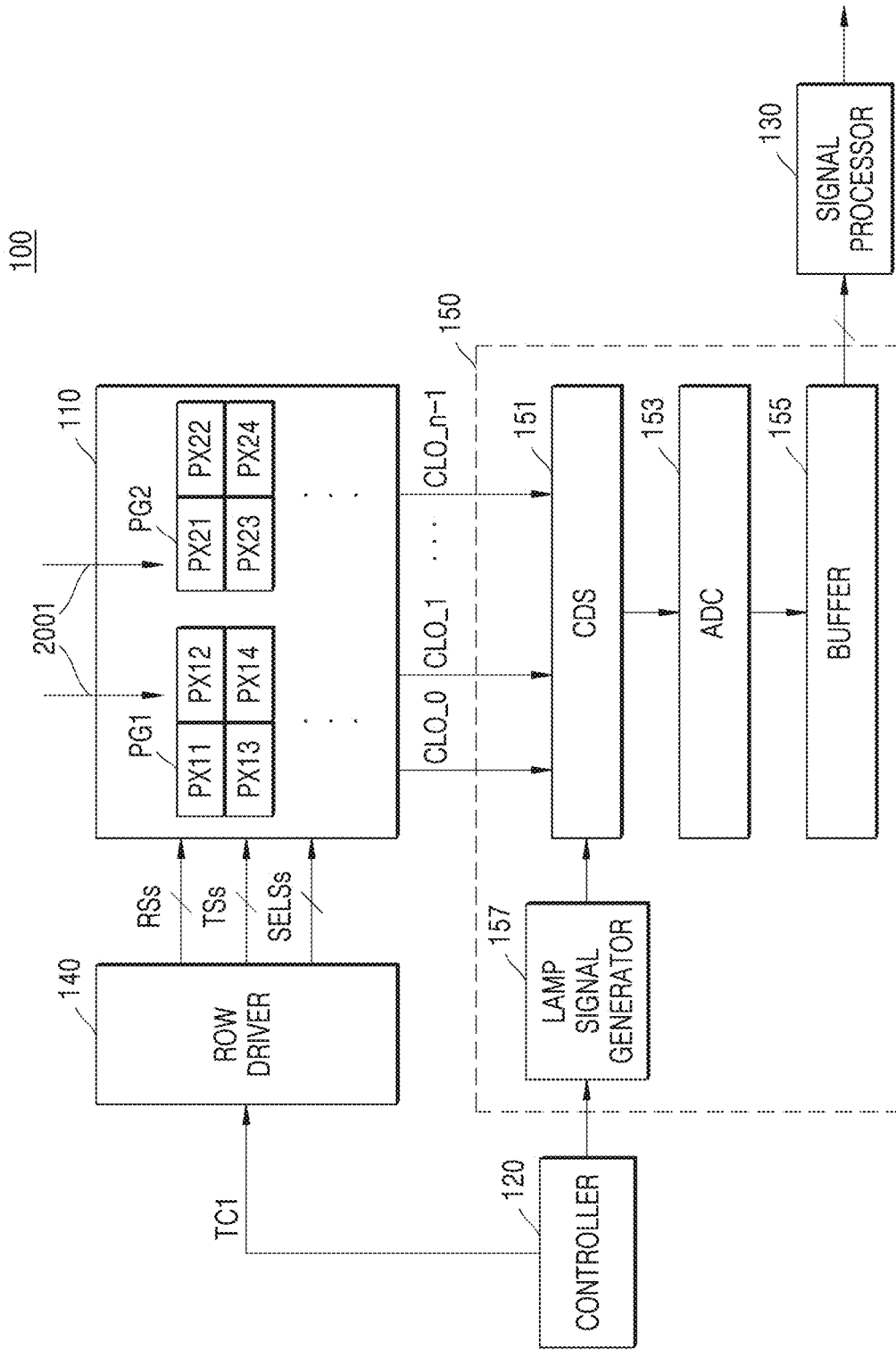
FIG. 2 is a block diagram of a configuration of an image sensor according to some example embodiments of the inventive concepts.

FIG. 2 is a block diagram of a configuration of the image sensor 100 according to some example embodiments.

Referring to FIG. 2, the image sensor 100 may include the pixel array 110, the controller 120, the signal processor 130, a row driver 140, and a signal reader 150. The signal reader 150 may include a correlated-double sampler (CDS) 151, an analog-digital converter (ADC) 153, and a buffer 155.

The pixel array 110 may include a first pixel group PG1 and a second pixel group PG2. The first pixel group PG1 may include a plurality of pixels PX11 to PX14, and the second pixel group PG2 may include pixels PX11 to PX24. The plurality of pixels PX11 through PX24 may generate an image signal based on light 2001 reflected from the object 2000 in FIG. 1 and incident on the pixel array 110.

According to some example embodiments, a pixel group may include a plurality of pixels sharing a floating diffusion (FD) node, and the pixel group may be referred to as a shared pixel. For example, the first pixel group PG1 may include a plurality of pixels PX11 through PX14 connected to a first FD node. As another example, the second pixel group PG2 may include a plurality of pixels PX21 through PX24 connected to a second FD node, the second FD node being different from the first FD node.

According to some example embodiments, the first pixel group PG1 and the second pixel group PG2 may be adjacent to each other. Referring to FIG. 2, the first pixel group PG1 and the second pixel group PG2 may be adjacent to each other in a horizontal direction. However, some example embodiments are not limited thereto. The first pixel group PG1 and second pixel group PG2 may be adjacent to each other in a vertical direction.

A plurality of pixel groups may respectively output pixel information to the CDS 151 through corresponding n column output lines CLO_0 through CLO_n-1. For example, the first pixel group PG1 may provide a pixel signal to the CDS 151 through a first column output line CLO_0. The second pixel group PG2 may provide the pixel signal to the CDS 151 via a second column output line CLO_1.

Figure 3A:
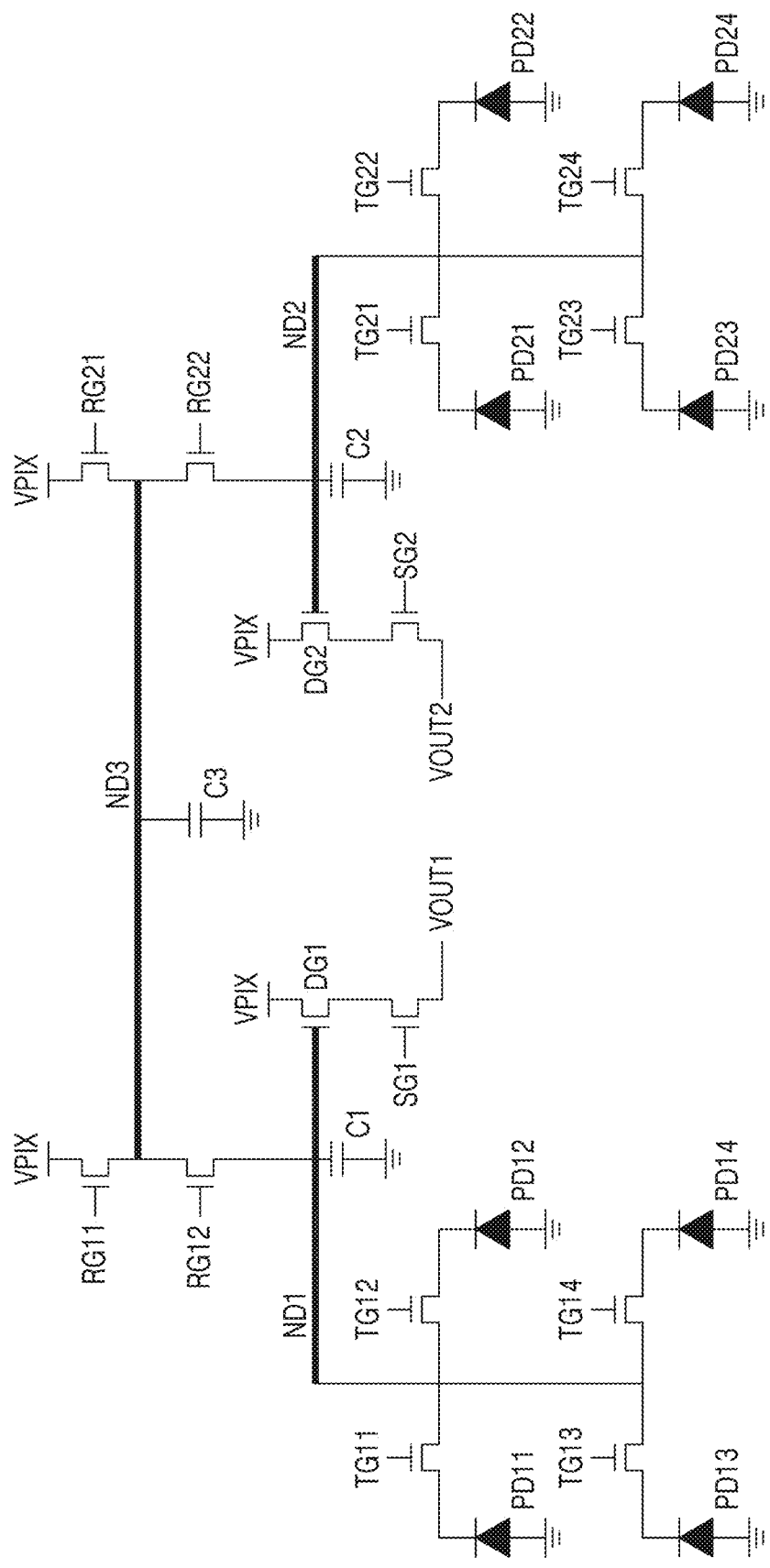
FIGS. 3A and 3B respectively illustrate a circuit diagram and a layout of a first pixel group and a second pixel group.

Each pixel group may include a plurality of pixels. According to some example embodiments, the first pixel group PG1 and the second pixel group PG2 may respectively include four pixels. Each of the plurality of pixels may include a corresponding photo-sensing element. The photo-sensing element may absorb light (e.g., light 2001) and generate a charge in response to the absorbing. For example, the photo-sensing element may be a photodiode. It will be understood that any photo-sensing element as described herein may be a photodiode. The first pixel group PG1 may include a plurality of photodiodes and the first FD node. The first FD node may be shared by the plurality of photodiodes. Restated, the first pixel group PG1 may include a plurality of first photodiodes (e.g., PX11 to PX14) sharing a first node (first FD node, e.g., ND1 as shown in FIG. 3A) connected to a first capacitor (e.g., C1 as shown in FIG. 3A). Like the description of the first pixel group PG1, the second pixel group PG2 may include a plurality of photodiodes and an FD node shared by the plurality of photodiodes. Restated, the second pixel group PG2 may include a plurality of first photodiodes (e.g., PX21 to PX24) sharing a second node (second FD node, e.g., ND2 as shown in FIG. 3A) connected to a second capacitor (e.g., C2 as shown in FIG. 3A).

The controller 120 may control the row driver 140 such that the pixel array 110 may absorb light 2001 to accumulate charge or temporarily store the accumulated charge and output an electrical signal according to the stored charge to the outside of the pixel array 110. In addition, the controller 120 may control the signal reader 150 such that the pixel array 110 may measure a level of the pixel signal.

The row driver 140 may generate signals such as reset control signals RSs, transmission control signals TSs, and selection signals SELSs for controlling the pixel array 110 and provide the signals to a plurality of pixel groups PGs. In some example embodiments, the row driver 140 may determine a timing of activating and deactivating the reset control signals RSs, the transmission control signals RSs, and the selection signals SELSs provided to the plurality of pixel groups based on whether a DCG function is performed or not.

The CDS 151 may sample and hold the pixel signal received from the pixel array 110. The CDS 151 may double-sample a level of specific noise and a level according to the pixel signal output a level corresponding to the difference. In addition, the CDS 151 may receive and compare lamp signals generated from a lamp signal generator 157 and output the comparison result. The ADC 153 may convert an analog signal corresponding to a level received from the CDS 151 into a digital signal. The buffer 155 may latch the digital signal and the latched signal may be sequentially output (e.g., transmitted) to the signal processor 130 or the outside of the image sensor 100.

The signal processor 130 may perform a signal processing operation based on the received pixel signal. For example, the signal processor 130 may perform a noise reduction processing operation, a gain adjustment operation, a waveform shaping processing operation, an interpolation processing operation, a white-balance processing operation, a gamma processing operation, an edge emphasis processing operation, or the like.

Figure 3B:
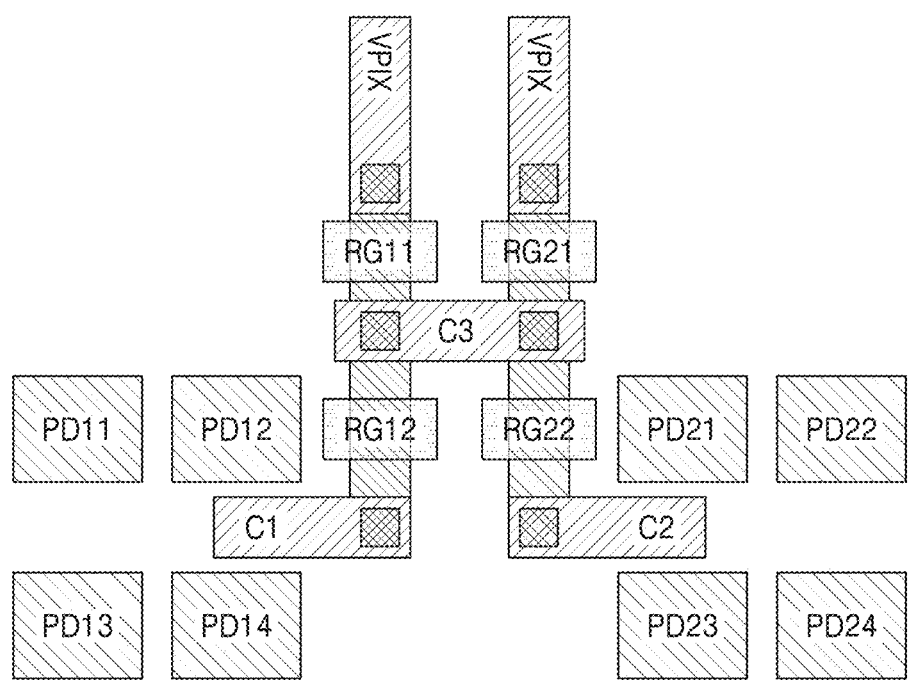

FIGS. 3A and 3B respectively illustrate a circuit diagram and a layout of the first pixel group PG1 and the second pixel group PG2.

Hereinafter, the first pixel group PG1 will now be described for convenience of explanation, but the description of the first pixel group PG1 may be equally applied to the second pixel group PG2 and other pixel groups.

The first pixel group PG1 may include a plurality of photo-sensing elements PD11 through PD14, a plurality of transfer transistors TG11 through TG14, a selection transistor SG1, a driving transistor DG1, and reset transistors RG11 and RG12.

Each of the plurality of photo-sensing elements PD11 through PD14 may generate a photo-charge according to an intensity of the incident light (e.g., light 2001). For example, each of the plurality of photo-sensing elements PD11 through PD14 is a P-N junction diode and may generate a charge, that is, electrons as a negative charge and holes as a positive charge, in proportion to the amount of received light. Each of the plurality of photo-sensing elements PD11 through PD14 may include, as an example of photoelectric conversion elements, at least one of a phototransistor, a photo gate, a pinned photo diode (PPD), and a combination thereof.

In some example embodiments, each photo-sensing element of the plurality of photo-sensing elements PD11 through PD14 (e.g., first photodiodes) includes a first color filter configured to selectively transmit a limited portion of the incident light having a first wavelength spectrum associated with a first color. In some example embodiments, each photo-sensing element of the plurality of photo-sensing elements PD21 through PD24 (e.g., second photodiodes) includes a second color filter configured to selectively transmit light associated with a limited portion of the incident light having a second wavelength spectrum associated with a second color. The first color may be different from the second color, and thus the first wavelength spectrum may be different from the second wavelength spectrum.

Each of the plurality of transfer transistors TG11 through TG14 may transmit the photo-charge generated in the photo-sensing elements PD11 through PD14 to a first node ND1, according to the transmission control signal TSs in FIG. 2. The first node ND1 may be referred to as a first floating diffusion node of the first pixel group PG1 and which is shared by the photo-sensing elements PD11 through PD14 (e.g., plurality of first photodiodes). Similarly, the second node ND2 may be referred to as a second floating diffusion node of the second pixel group PG2 and which is shared by the photo-sensing elements PD21 through PD24 (e.g., plurality of second photodiodes).

A first capacitor C1 may store the transmitted photo-charge transmitted from the plurality of photo-sensing elements PD11 through PD14 through the plurality of transfer transistors TG11 through TG14. The first capacitor C1 may be connected to the first node ND1 and cause (e.g., generate) a voltage based on storing the transmitted photo-charge. When a capacitance value of the first capacitor C1 is small, a small amount of charge may be stored and the magnitude of a voltage change of the first node ND1 may also be small. Accordingly, the image sensor 100 may operate in the HCG mode when a capacitance value of the first node ND1 is small. When the capacitance value of the first capacitor C1 is large, a large amount of charge may be stored and the magnitude of the voltage change may also be large. Accordingly, the image sensor 100 may operate in the LCG mode when the capacitance value of the first node ND1 is large.

Similarly to the first capacitor C1, the second capacitor C2 may store the transmitted photo-charge transmitted from the plurality of photo-sensing elements PD21 through PD24 through the plurality of transfer transistors TG21 through TG24. The second capacitor C2 may be connected to the second node ND2 and cause (e.g., generate) a voltage based on storing the transmitted photo-charge.

The driving transistor DG1 may correspond to a buffer amplifier. The driving transistor DG1 may be referred to as a source follower (SF). Since a gate of the driving transistor DG1 is connected to the first node ND1, a voltage of the first node ND1 may correspond to a gate voltage of the driving transistor DG1. That is, the driving transistor DG1 may amplify a value of the gate voltage which is changed based on the photo-charge transmitted to the first node ND1 and output a pixel signal VOUT1.

The selection transistor SG1 may output the pixel signal VOUT1 to the CDS (for example, 151 in FIG. 2) through the first column output line CLO_0 by connecting a drain node to a source node of the driving transistor DG1 in response to the selection signal (for example, SELSs in FIG. 2).

The first pixel group PG1 may include the first reset transistor RG11 and the second reset transistor RG12. The first reset transistor RG11 and the second reset transistor RG12 may be connected in series through a third node ND3. The third node ND3 may be connected to a third capacitor C3. When the second reset transistor RG12 is turned on, the first node ND1 and the third node ND3 may be connected. Accordingly, the second reset transistor RG12 may be configured to selectively connect the first node ND1 to the third node ND3. When the first reset transistor RG11 is turned on, the third node ND3 and a pixel voltage node VPIX may be connected. Accordingly, the first reset transistor RG11 and the second reset transistor RG21 may each be configured to selectively connect the third node ND3 to the pixel voltage node VPIX and may be configured to reset the third node ND3 to a pixel voltage according to an operation of the first reset transistor RG11 and/or the second reset transistor RG21.

The first reset transistor RG11 and the second reset transistor RG12 may perform the DVG operation. Accordingly, the first reset transistor RG11 and the second reset transistor RG22 may be collectively configured to selectively electrically connect the first node ND1, the second node ND2, and the third node ND3 to each other according to an operation of the first reset transistor RG11 and the second reset transistor RG22. For example, in a case of the HCG mode, the first reset transistor RG11 may be turned on and the second reset transistor RG12 may be turned off. Since the first reset transistor RG11 is turned on, the first reset transistor RG11 may be equivalent to a short circuit. Accordingly, a voltage value of the pixel voltage node VPIX may be transmitted to a drain terminal of the second reset transistor RG12. In the HCG mode, when the second reset transistor RG12 is turned on, the second reset transistor RG12 may be equivalent to a short circuit. Accordingly, the first node ND1 may be reset to the voltage value of the pixel voltage node VPIX sequentially through the second reset transistor RG12 and the first reset transistor RG11.

In a case of the LCG mode, the first reset transistor RG11 may be turned off and the second reset transistor RG12 may be turned on. Since the second reset transistor RG12 is turned on, the second reset transistor RG12 may be equivalent to a short circuit. Meanwhile, since a third reset transistor RG21 and a fourth reset transistor RG22 included in the second pixel group PG2 respectively operate in a same manner as the first reset transistor RG11 and the second reset transistor, the fourth reset transistor RG22 may be short-circuited in the LCG mode. Accordingly, the fourth reset transistor RG22 may be configured to selectively connect the second node ND2 to the third node ND3. Since both the second reset transistor RG12 and the fourth reset transistor RG22 are short-circuited, the first node ND1 and the third node ND3 may be integrated into one node. Therefore, when viewing the first node ND1 or the third node ND3, the first capacitor C1, the second capacitor C2, and the third capacitor C3 may be connected in parallel and a total capacitance C1+C2+C3 of the first node ND1 or the third node ND3 may be increased. When the first reset transistor RG11 is turned on in the LCG mode, charges accumulated in the first node ND1 (or the third node ND3) may be discharged to the pixel voltage node VPIX along the first reset transistor RG11. Herein, the charges accumulated in the first node ND1 (or the third node ND3) may be referred to as a sum of charges stored in the first capacitor C1 to the third capacitor C3.

According to some example embodiments, the image sensor 100 may dynamically set the capacitance value of the floating diffusion node (for example, the first node ND1 of the first pixel group PG1). When the HCG is utilized, for example, when a surrounding luminance is low, the image sensor 100 may turn on a reset transistor (for example, the first reset transistor RG11) connected to the pixel voltage node VPIX and control the second reset transistor RG12 to perform a reset operation only with an FD node having a small capacitance value of the first capacitor C1. When the LCG is utilized, for example, when the surrounding luminance is low, the image sensor 100 may increase the capacitance value of the FD node to a total sum of capacitances of the first capacitor C1 to the third capacitor C3 (e.g., the first capacitor C1, the second capacitor C2, and the third capacitor C3) by turning on the second reset transistor RG12 and the fourth reset transistor RG22 connected to the third node ND3 and perform a reset operation in the floating diffusion node having a high capacitance value by controlling the first reset transistor RG11.

Referring to FIG. 3B, a layout implementing the circuit diagram of FIG. 3A is shown. Hereinafter, for convenience of explanation, the pixel voltage node VPIX connected to drain nodes of the transfer transistors TG11 through TG24, the driving transistors DG1 and DG2, the selection transistors SG1 and SG2, and the driving transistors DG1 and DG2 may be shown as omitted.

The first pixel group PG1 and the second pixel group PG2 supporting the DCG may respectively include four pixels PD11 through PD14 and PD21 through PD24, and the first pixel group PG1 may be adjacent to the second pixel group PG2.

Four reset transistors RG11 through RG22 and six metal contacts may be formed in the first pixel group PG1 and the second pixel group PG2. In detail, the six metal contacts may include a metal contact connected to the first capacitor C1 at the first node ND1, a metal contact connected to the second capacitor C2 at the second node ND2, two metal contacts simultaneously connected to the first node ND1 of the first pixel group PG1 and the second node ND2 of the second pixel group PG2 from the third node ND3 with the third capacitor C3, and two metal contacts respectively connected to the pixel voltage nodes VPIXs in the first reset transistor RG11 and the third reset transistor RG21.

The image sensor 100 may connect the first node ND1, the second node ND2, and the third node ND3 to one node by turning on and short-circuiting the second reset transistor RG12 and the fourth reset transistor RG22. Therefore, the capacitance value of the floating diffusion node of the first pixel group PG1 may increase.

When the size of a pixel is relatively large compared to the metal contact, arranging the first to third capacitors C1 through C3 and the metal contacts between the first pixel group PG1 and the second pixel group PG2 adjacent to the first pixel group PG1 may be easy. However, when the size of the pixel is relatively small according to the miniaturization of the size of the pixel and the size of the metal contact is relatively increased, arranging the first to third capacitors C1 through C3 with the metal contacts while satisfying a design rule may be difficult.

Therefore, a layout using a reduced number of transistors and metal contacts while supporting the same DCG may be implemented. This will be described later reference to FIGS. 4 to 10B.

Figure 4:
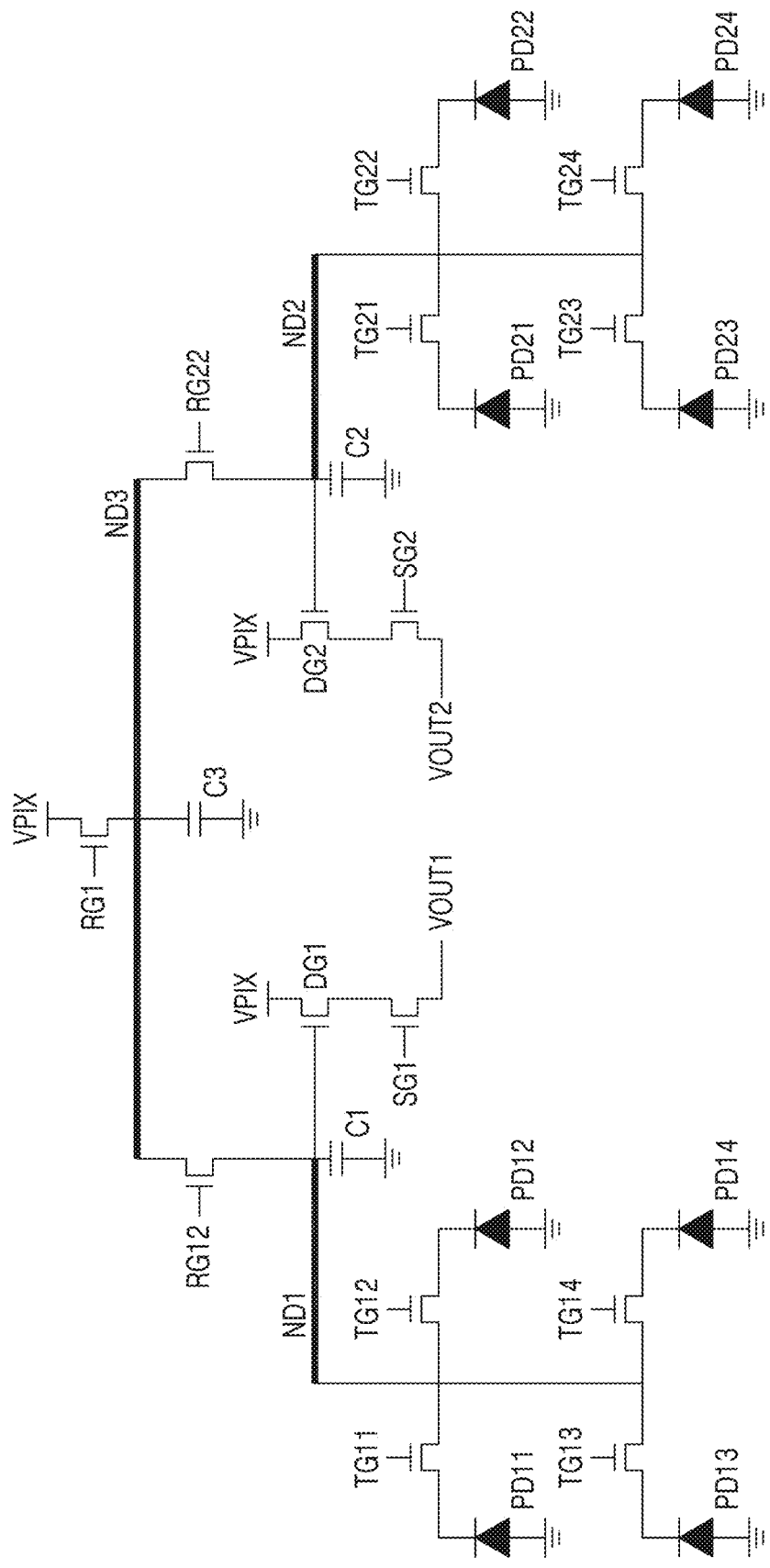
FIG. 4 is a circuit diagram in which the first pixel group and the second pixel group share transistors and voltage nodes according to some example embodiments of the inventive concepts.

FIG. 4 is a circuit diagram in which the first pixel group PG1 and the second pixel group PG2 share transistors and voltage nodes according to some example embodiments. Hereinafter, descriptions previously given above are omitted.

Referring to FIG. 4, the first reset transistor RG11 and the third reset transistor RG21 of FIG. 3A may be replaced by one transistor: shared reset transistor RG1, also referred to herein as a common transistor, which may be a common transistor configured to reset the third node ND3 to a pixel voltage according to an operation of the common transistor.

The first reset transistor RG11 and the third reset transistor RG21 in FIG. 3A may be replaced with one transistor, shared reset transistor RG1, since the first reset transistor RG11 and the third reset transistor RG21 are turned on or turned off in response to a reset control signal (for example, RSs) at a same timing. In addition, since the pixel voltage node VPIX connected to the first reset transistor RG11 and the pixel voltage node VPIX connected to the third reset transistor RG21 in FIG. 3A are common, the two pixel voltage nodes VPIX may be replaced by one pixel voltage node VPIX.

Therefore, referring to FIGS. 3A, 3B, and 4 together, the number (e.g., quantity) of transistors used may be reduced by one and the number of metal contacts connected to the pixel voltage node may also be reduced by one by sharing the first reset transistor RG11 of the first pixel group PG1 and the third reset transistor RG21 of the second pixel group as one reset transistor, shared reset transistor RG1, and connecting the pixel voltage node VPIX.

Although the first pixel group PG1 is shown as including four photo-sensing elements PD11 through PD14 and four transfer transistors TG11 through TG14 in the drawings, the inventive concepts are not limited thereto. The number (e.g., quantity) of photo-sensing elements and the number of transfer transistors included in the first pixel group PG1 may vary according to some example embodiments to maintain an appropriate balance between an area gain, which may be obtained as the number of floating diffusion nodes shared increases, and a read speed, which may be reduced.

In some example embodiments, the image sensor 100 may be configured to turn on the shared reset transistor RG1, and turn off both the second and fourth reset transistors RG12 and RG22, to set a first conversion gain of the photo-sensing elements PD11 through PD14 based on the first capacitor C1, and set second conversion gain of the photo-sensing elements PD21 through PD24 based on the second capacitor C2. In some example embodiments, the image sensor 100 may be configured to turn off the shared reset transistor RG1, and turn on both the second and fourth reset transistors RG12 and RG22, to set each of a first conversion gain of the photo-sensing elements PD11 through PD14 and a second conversion gain of the photo-sensing elements PD21 through PD24 based on the first capacitor C1, the second capacitor C2, and the third capacitor C3.

Figure 5A:
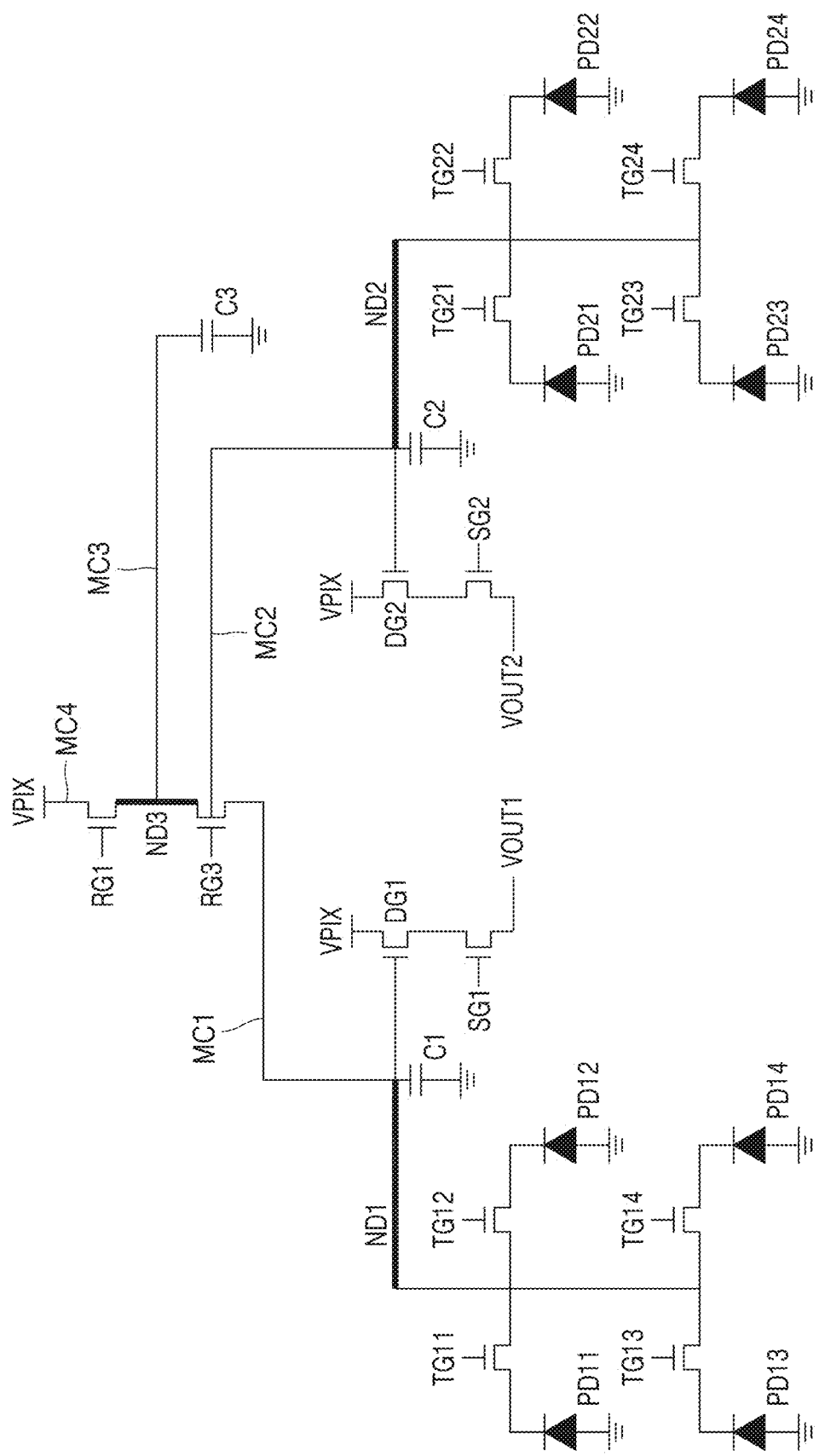
FIGS. 5A and 5B respectively illustrate a circuit diagram and a layout in which a 3-way transistor is used according to some example embodiments of the inventive concepts.
Figure 5B:
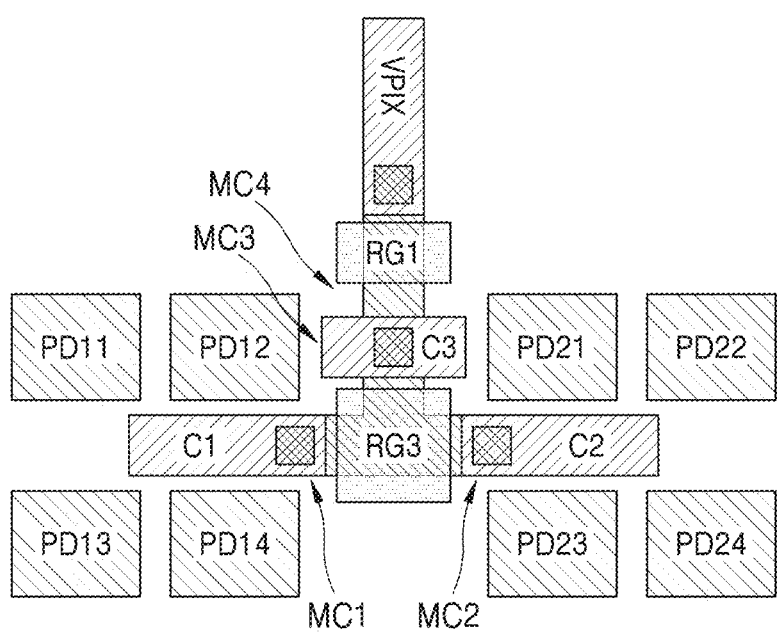

FIGS. 5A and 5B respectively illustrate a circuit diagram and a layout in which a 3-way transistor RG3 is used according to some example embodiments. Hereinafter, descriptions previously given above are omitted.

Referring to FIGS. 4 and 5A, the second reset transistor RG12 and the fourth reset transistor RG22 may be replaced with (e.g., may be collectively comprised by) a 3-way transistor RG3. The 3-way transistor RG3 may include three terminals, and each terminal of the three terminals may be connected (e.g., directly connected) to a separate one of the first node ND1, the second node ND2, and the third node ND3. The 3-way transistor RG3 may generate an electrical connection between the first node ND1 to the third node ND3 based on the reset control signals RSs. For example, when the 3-way transistor RG3 is turned on, the first node ND1, the second node ND2, and the third node ND3 may be electrically connected to each other to be equivalent to one node.

According to some example embodiments, the image sensor 100 may support the LCG mode by controlling the 3-way transistor RG3 and a shared reset transistor RG1 (also referred to herein as a common transistor). For example, the image sensor 100 may turn off the shared reset transistor RG1 and turn on the 3-way transistor RG3 to support the LCG mode. When the 3-way transistor RG3 is turned on, the first node ND1 to the third node ND3 are connected to each other to operate as one node and the first capacitor C1 to the third capacitor C3 respectively connected to the first node ND1 to the third node ND3 may be connected in parallel. Therefore, a value of capacitance viewed from the first floating diffusion node (that is, the first node ND1) of the first pixel group PG1 may be increased.

According to some example embodiments, the image sensor 100 may support the HCG mode by controlling the 3-way transistor RG3 and the shared reset transistor RG1. For example, the image sensor 100 may turn on the shared reset transistor RG1 and turn off the 3-way transistor RG3 to support the HCG mode. The shared reset transistor RG1 may selectively connect the third node ND3 to the pixel voltage node VPIX. When the shared reset transistor RG1 is turned on, which is equivalent to a short circuit, a voltage of a terminal connected to the third node ND3 of the 3-way transistor RG3 may be set to a voltage value of the pixel voltage node VPIX. Thereafter, when the 3-way transistor RG3 is turned on, photo-charges stored in the first node ND1 of the first pixel group PG1 may be discharged through the shared reset transistor RG1 and the pixel voltage node VPIX. A capacitance value of the first pixel group PG1 may correspond to a capacitance value of the first capacitor C1. A reset operation of the first pixel group PG1 may be equally applied to a reset operation of the second pixel group PG2.

Referring to FIG. 5B, a layout implementing the circuit diagram of FIG. 5A is shown. Hereinafter, for convenience of explanation, the pixel voltage node VPIX connected to the drain nodes of the transfer transistors TG11 through TG24, the driving transistors DG1 and DG2, the selection transistors SG1 and SG2, and the driving transistors DG1 and DG2 may be shown as omitted.

Referring to FIGS. 3B and 5B together, two reset transistors and four metal contacts may be formed in the first pixel group PG1 and the second pixel group PG2. The two reset transistors may include the shared reset transistor RG1 and the 3-way transistor RG3. The four metal contacts may include a first metal contact MC1 arranging the first capacitor C1 at the first node and connecting (e.g., directly connecting) the first capacitor C1 to the 3-way transistor RG3, a second metal contact MC2 arranging the second capacitor C2 at the second node ND2 and connecting (e.g., directly connecting) the second capacitor C2 to the 3-way transistor RG3, a third metal contact MC3 arranging the third capacitor C3 at the third node ND3 and connecting (e.g., directly connecting) the third capacitor C3 to the 3-way transistor RG3, and a fourth metal contact MC4 connecting (e.g., directly connecting) the shared reset transistor RG1 to the pixel voltage node VPIX. As shown in FIG. 5B, the first metal contact MC1 and the second metal contact MC2 may be aligned in a horizontal direction, and the third metal contact MC3 and the fourth metal contact MC4 may be aligned in a vertical direction. As shown in FIG. 5B, a center of the third metal contact MC3 and the fourth metal contact MC4 may have a concave-convex shape ⊥ isolated from direct contact with a center of the first metal contact MC1 and the second metal contact MC2 in the vertical direction.

According to some example embodiments and comparing FIGS. 4 and 5B, the number (e.g., quantity) of transistors used may be reduced by one by replacing the second reset transistor RG12 and the fourth reset transistor RG22 with the 3-way transistor RG3. In addition, the third capacitor C3 may utilize two metal contacts to be respectively connected to the first node ND1 and the second node ND2 in FIG. 4, but one metal contact may be additionally reduced by connecting the third capacitor C3 only to the third node ND3 in FIG. 5B.

Figure 6A:
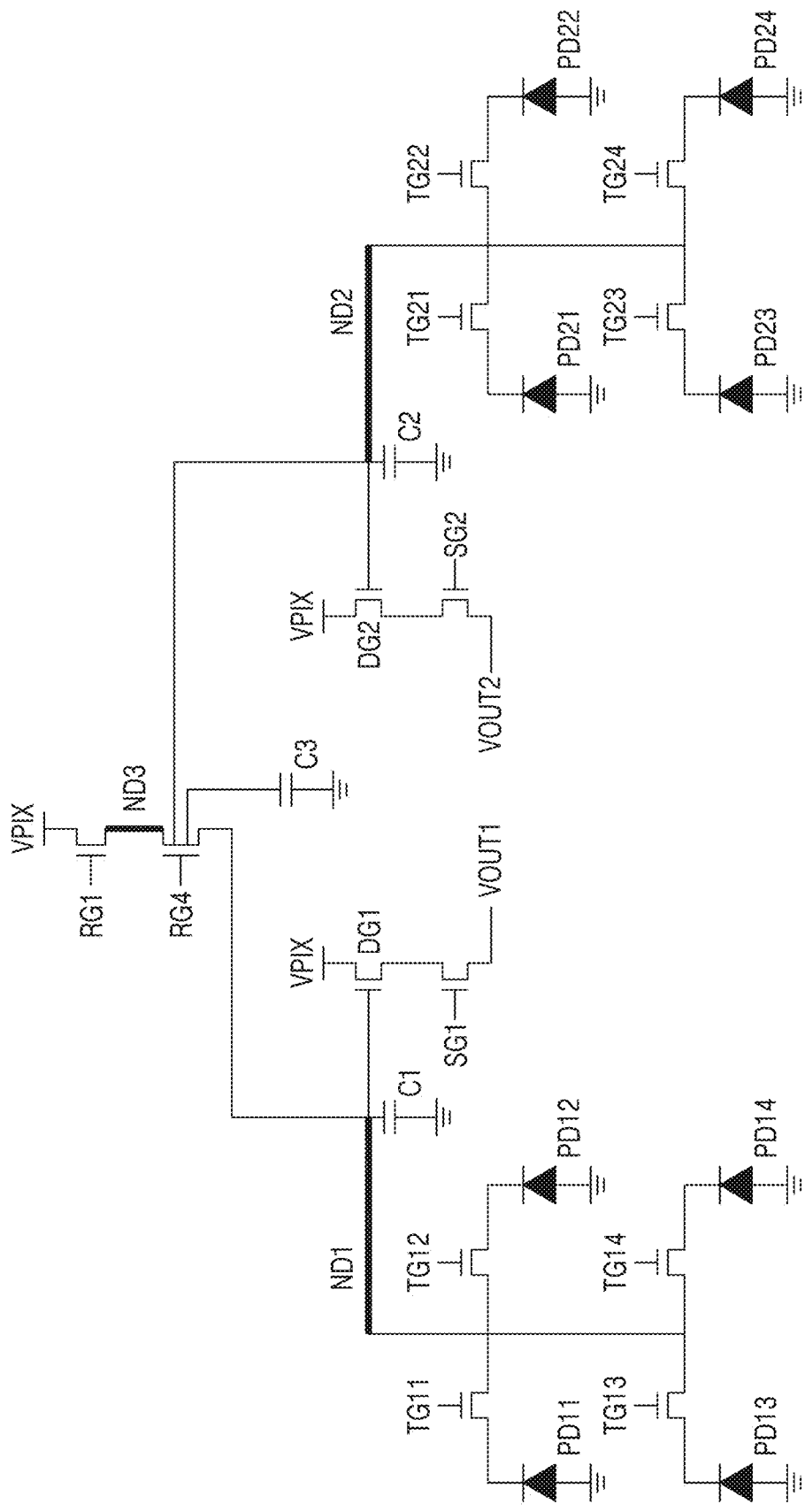
FIGS. 6A and 6B respectively illustrate a circuit diagram and a layout in which a 4-way transistor is used according to some example embodiments of the inventive concepts.
Figure 6B:
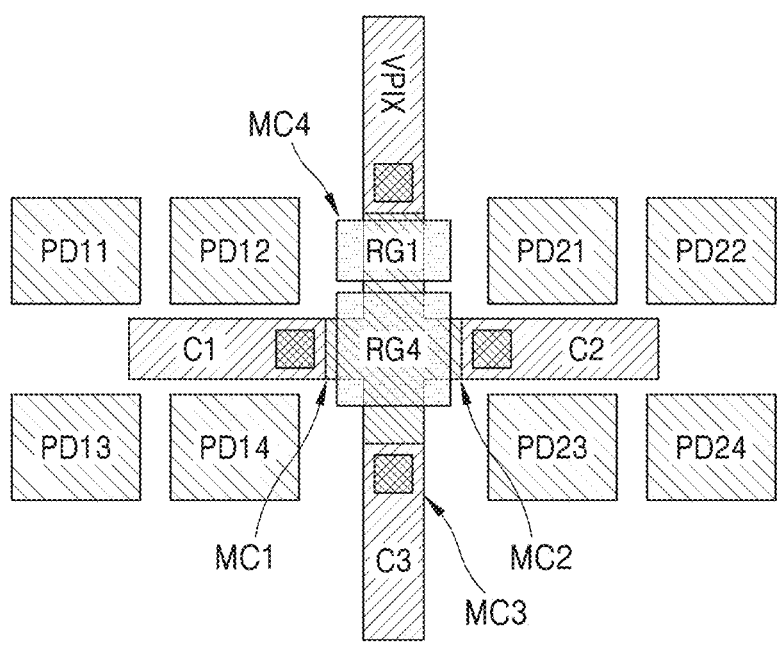

FIGS. 6A and 6B respectively illustrate a circuit diagram and a layout in which a 4-way transistor RG4 is used according to some example embodiments. Hereinafter, descriptions previously given above are omitted.

Referring to FIGS. 5A and 6A, the 3-way transistor RG3 of FIG. 5A may be replaced with (e.g., may be collectively comprised by) the 4-way transistor RG4. The 4-way transistor RG4 may include four terminals, and each terminal of the four terminals may be connected (e.g., directly connected) to a separate one of the first node ND1, the second node ND2, the third node ND3, and the third capacitor C3. The 4-way transistor RG4 may be connected to the first pixel group PG1 through the first node ND1, may be connected to the second pixel group PG2 through the second node ND2, and may be connected to the shared reset transistor (e.g., shared reset transistor RG1) and the pixel voltage node VPIX through the third node ND3. Restated, the terminal directly connected to the third node may be connected to the shared reset transistor RG1 via the third node ND3.

According to some example embodiments, referring to FIG. 5A, the third capacitor C3 connected in parallel to the third node ND3 may be rearranged to be connected to another terminal except for the terminals connected to the first node ND1 to the third node ND3 of the 4-way transistor RG4. A space between the first pixel group PG1 and the second pixel group PG2 may be efficiently used by rearranging the third capacitor C3.

Referring to FIG. 6B, a layout implementing the circuit diagram of FIG. 6A is shown. Hereinafter, for convenience of explanation, the pixel voltage node VPIX connected to the drain nodes of the transfer transistors TG11 through TG24, the driving transistors DG1 and DG2, the selection transistors SG1 and SG2, and the driving transistors DG1 and DG2 may be shown as omitted.

Referring to FIGS. 5B and 6B together, two reset transistors and four metal contacts may be formed in the first pixel group PG1 and the second pixel group PG2. The two reset transistors may include the shared reset transistor RG1 and the 4-way transistor RG4. The four metal contacts may include three metal contacts forming an electrical connection from the 4-way transistor RG4 to the first capacitor C1 through the third capacitor C3, (e.g., a first metal contact MC1 connecting the first capacitor C1 to the 4-way transistor RG4, a second metal contact MC2 connecting the second capacitor C2 to the 4-way transistor RG4, and a third metal contact MC3 connecting the third capacitor to the 4-way transistor RG4) and one metal contact (e.g., fourth metal contact MC4) connecting the shared reset transistor RG1 to the pixel voltage node VPIX.

According to some example embodiments and comparing FIGS. 5B and 6B, the number ("quantity") of transistors and the number of metal contacts may be the same. However, a concave-convex shape ⊥ defined by the metal contacts may be changed into a cross shape + based on rearranging the third metal contact MC3 connected to the third capacitor C3 to be connected (e.g., directly connected) to a lower terminal of the 4-way transistor RG4. As shown in FIG. 6B, the first metal contact MC1 and the second metal contact MC2 may be aligned in a horizontal direction, and the third metal contact MC3 and the fourth metal contact MC4 may be aligned in a vertical direction, and a center of the third metal contact MC3 and the fourth metal contact MC4 may be formed to have a cross shape + in conformity with a center of the first metal contact MC1 and the second metal contact MC1. As a result, space efficiency may be increased and a layout complexity of the image sensor supporting the DCG function may be reduced by arranging two metal contacts in a vertical direction (e.g., MC3 and MC4) and two metal contacts in a horizontal direction (e.g., MC1 and MC2) to intersect with each other, as shown in at least FIG. 6B.

Figure 7A:
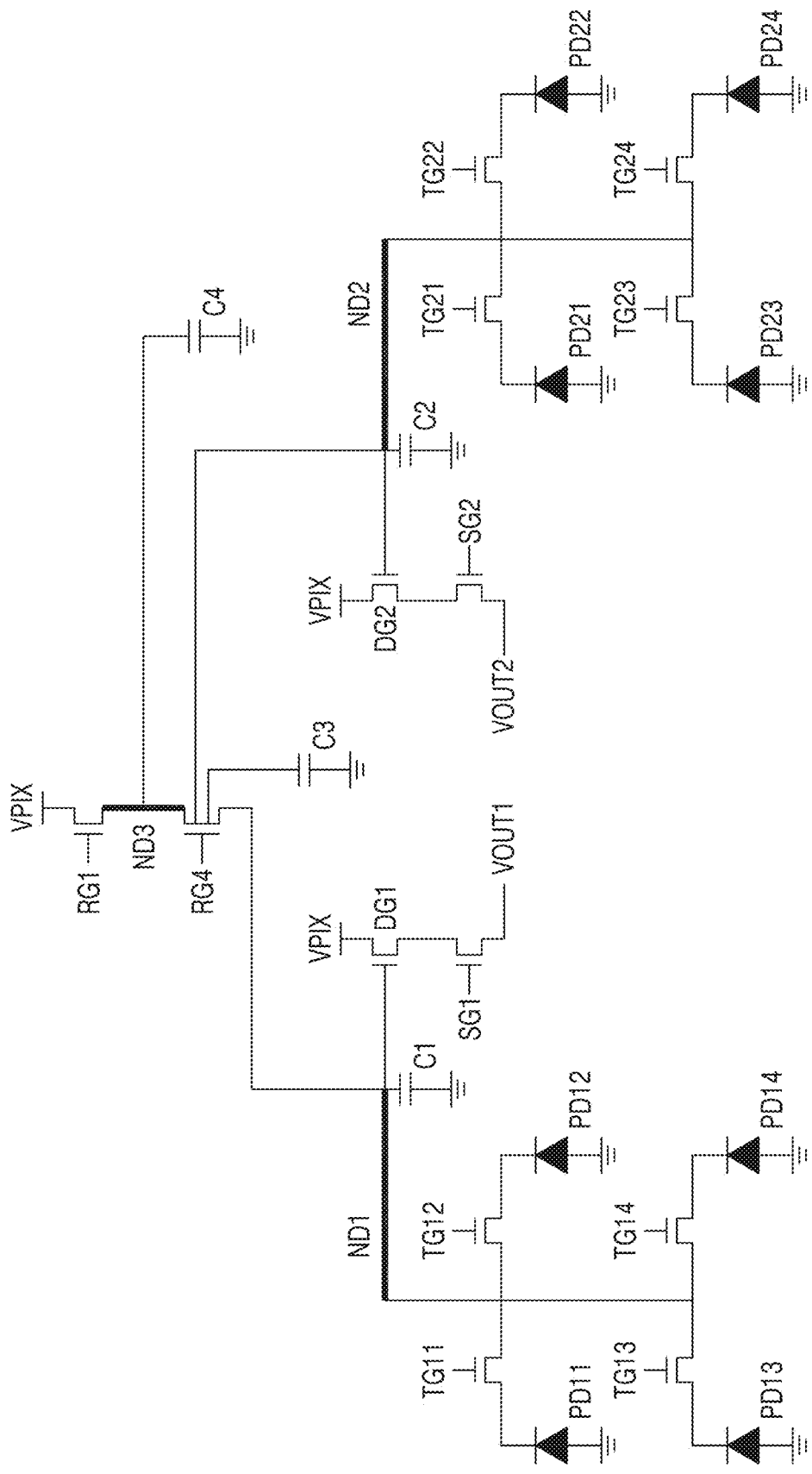
FIGS. 7A and 7B respectively illustrate a circuit diagram and a layout in which an additional capacitor is connected to a 4-way transistor according to some example embodiments of the inventive concepts.
Figure 7B:
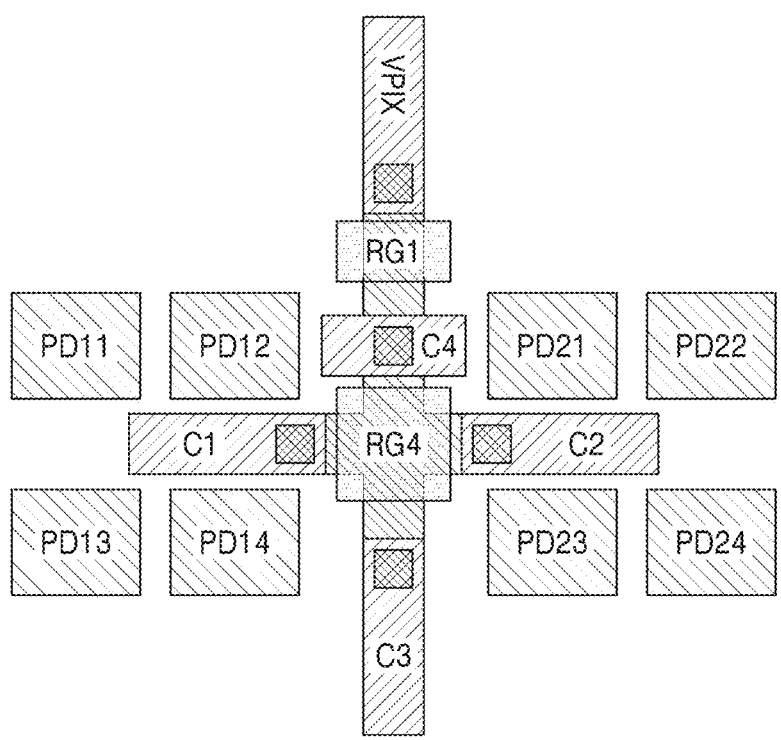

FIGS. 7A and 7B respectively illustrate a circuit diagram and a layout in which an additional (fourth) capacitor is connected to the 4-way transistor RG4 according to some example embodiments. Hereinafter, descriptions previously given above are omitted.

Referring to FIGS. 6A and 7A, the third node ND3 may further include a fourth capacitor C4. In FIG. 6A, the third node ND3 merely electrically connects the shared reset transistor RG1 and the 4-way transistor RG4, but the third node ND3 may further include the fourth capacitor C4 in FIG. 7A. As shown, the fourth capacitor C4 may be connected in parallel between the 4-way transistor RG4 and the shared reset transistor RG1.

According to some example embodiments, the image sensor 100 may support an LCG mode with a lower conversion gain. For example, referring to FIG. 6A, a total capacitance value may correspond to the sum of the capacitances of the first capacitor C1 to the third capacitor C3 even when the 4-way transistor RG4 is turned on and the first node ND1 to the third node ND3 connect to one node. In some example embodiments, referring to FIG. 7A, when the 4-way transistor RG4 is turned on and the shared reset transistor RG1 is turned off, a total capacitance viewed from the first pixel group PG1 may correspond to a sum of the capacitance of the first capacitor C1 of the first node ND1, the second capacitor C2 of the second node ND2 connected in parallel through the 4-way transistor RG4, the third capacitor C3 connected in parallel through the 4-way transistor RG4, and the fourth capacitor CG4 added to the third node ND3. Accordingly, since the value of the total capacitance viewed from the first pixel group PG1 has increased, the LCG mode with a lower conversion gain may be performed.

Referring to FIG. 7B, two reset transistors and five metal contacts may be formed in the first pixel group PG1 and the second pixel group PG2. The five metal contacts may further include, in addition to three metal contacts forming an electrical connection from the 4-way transistor RG4 to the first capacitor C1 through the third capacitor C3 and one metal contact connecting the shared reset transistor RG1 to the pixel voltage node VPIX, one metal contact forming an electrical connection from the 4-way transistor RG4 to the fourth capacitor C4.

According to some example embodiments and comparing FIGS. 6B and 7B, since the LCG mode with the lower conversion gain may be operated though the number of metal contacts may be increased, the image sensor 100 may improve object recognition ability in light of a brighter intensity.

Figure 8A:
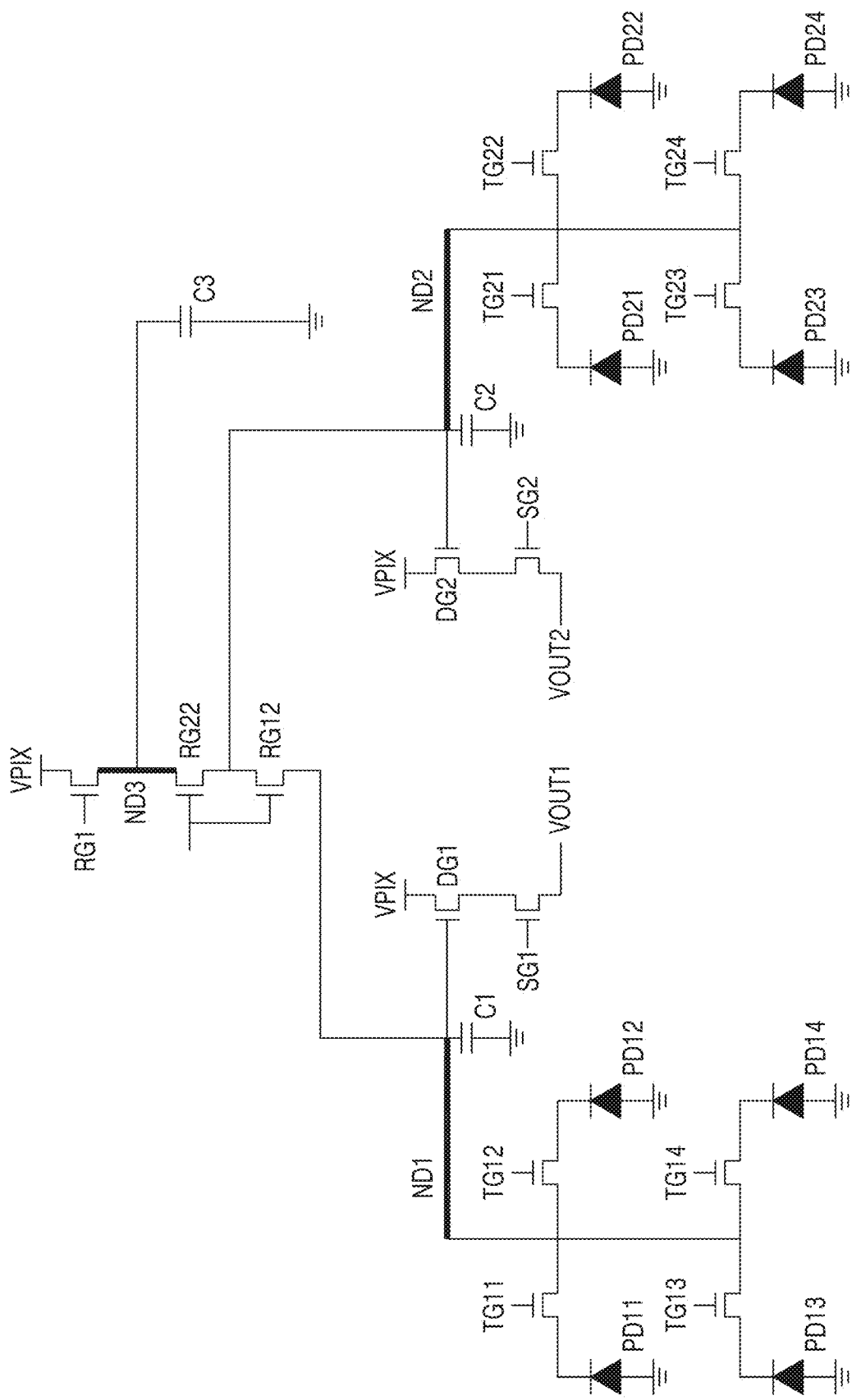
FIGS. 8A and 8B respectively illustrate a circuit diagram in which a first pixel group and a second pixel group share transistors and voltage nodes according to some example embodiments of the inventive concepts.
Figure 8B:
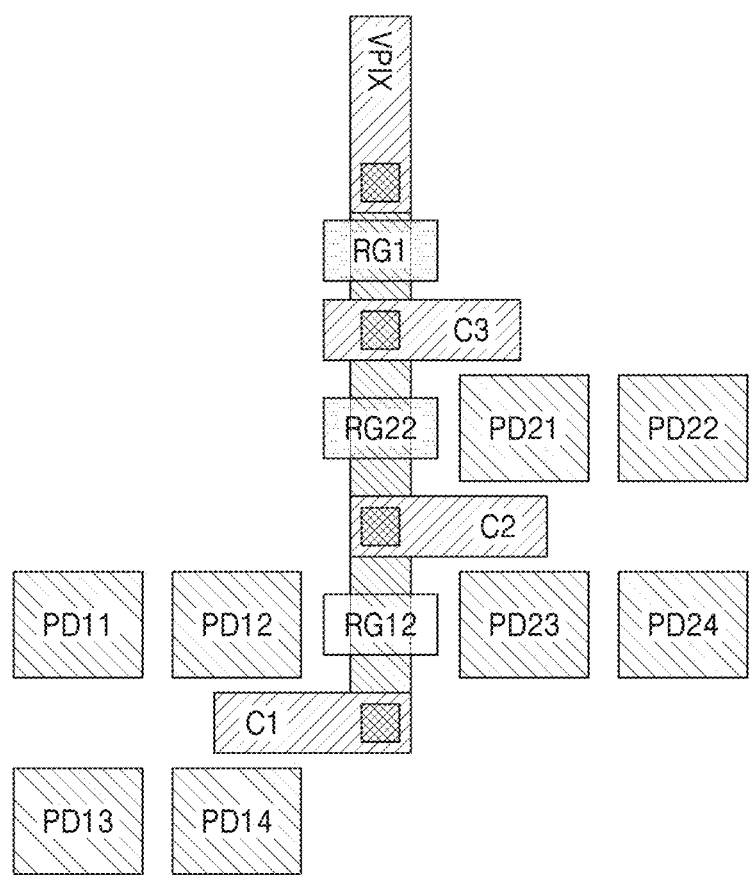

FIGS. 8A and 8B respectively illustrate a circuit diagram in which the first pixel group PG1 and the second pixel group PG2 share transistors and voltage nodes. Hereinafter, descriptions previously given above are omitted.

Referring to FIG. 8A, the second reset transistor RG12 and the fourth transistor RG22 may be connected in series. In FIG. 4, the second reset transistor RG12 and the fourth transistor RG22 may be connected in parallel with respect to the third node ND3. In some example embodiments, in FIG. 8A, a source terminal of the second reset transistor RG12 may be connected to the first node ND1 and a drain terminal of the second reset transistor RG12 may be connected to a source terminal of the fourth reset transistor RG22 or to the second node ND2. Accordingly, the second reset transistor RG12 may be configured to selectively connect the first node ND1 to the second node ND2. A drain terminal of the fourth reset transistor RG22 may be connected in parallel to a source terminal of the shared reset transistor RG1 and the third capacitor C3. Accordingly, the fourth reset transistor RG22 may be configured to selectively connect the second node ND2 to the third node ND3. As shown in FIG. 8A, the shared reset transistor RG1 may be configured to selectively connect the third node MD3 to the pixel voltage node VPIX. As shown in FIG. 8A, the third node includes an electrical connection with the third capacitor C3.

FIG. 8B shows a layout implementing the circuit diagram of FIG. 8A Hereinafter, for convenience of explanation, the pixel voltage node VPIX connected to the drain nodes of the transfer transistors TG11 through TG24, the driving transistors DG1 and DG2, the selection transistors SG1 and SG2, and the driving transistors DG1 and DG2 may be shown as omitted.

Referring to FIG. 8B, the metal contacts may be arranged in series. For example, a metal contact connecting the pixel voltage node VPIX to the shared reset transistor RG1, a metal contact connecting the third capacitor C3 to the third node ND3, a metal contact connecting the second capacitor C2 to the second node ND2, and a metal contact connecting the first capacitor C1 to the first node may be sequentially arranged in the vertical direction. Accordingly, the image sensor 100 may be configured to turn on the shared reset transistor RG1, the second reset transistor RG12, and the fourth reset transistor RG22 to establish an electrical connection in series according to a sequence of the pixel voltage node VPIX, the third capacitor C3, the second node ND2, and the first node ND1.

According to some example embodiments, the number of transistors arranged between the first pixel group PG1 and the pixel voltage node VPIX may be different from the number of transistors arranged between the second pixel group PG2 and the pixel voltage node VPIX. For example, the second reset transistor RG12, the fourth reset transistor RG22, and the shared reset transistor RG1, that is, three transistors may be arranged between the first pixel group PG1 and the pixel voltage node VPIX. As another example, the fourth reset transistor RG22 and the shared reset transistor RG1, that is, two transistors may be arranged between the second pixel group PG2 and the pixel voltage node VPIX. Accordingly, a number (e.g., quantity) of reset transistors between the first node ND1 and the pixel voltage node VPIX may be different from a number (e.g., quantity) of reset transistors between the second node ND2 and the pixel voltage node VPIX. A difference in the number of transistors from a neighboring pixel group to the pixel voltage node VPIX may be because the second reset transistor RG12 and the fourth reset transistor RG22 are connected in series.

According to some example embodiments, the metal contacts may be arranged along a straight line in the vertical direction without being arranged in the concave-convex shape ⊥ or the cross shape +. When the size of a pixel is relatively large compared to the metal contacts, an arrangement according to the concave-convex shape ⊥ or the cross shape + shown in FIGS. 4 to 7B may not be difficult. However, when the size of the pixel is reduced due to a fine operation and miniaturization (for example, a tetra-cell), an arrangement of a metal contact between two pixels (for example, PD11 and PD12 or PD13 and PD14), which are in parallel in the horizontal direction, may be difficult. Thus, as described above, forming a metal contact between two pixels which are in parallel in the horizontal direction in one pixel group may be avoided and the size of the pixel may be miniaturized (e.g., reduced and/or minimized) based on connecting the second reset transistor TG12 to the fourth reset transistor RG22 in series and arranging the capacitors between the transistors.

Figure 9B:
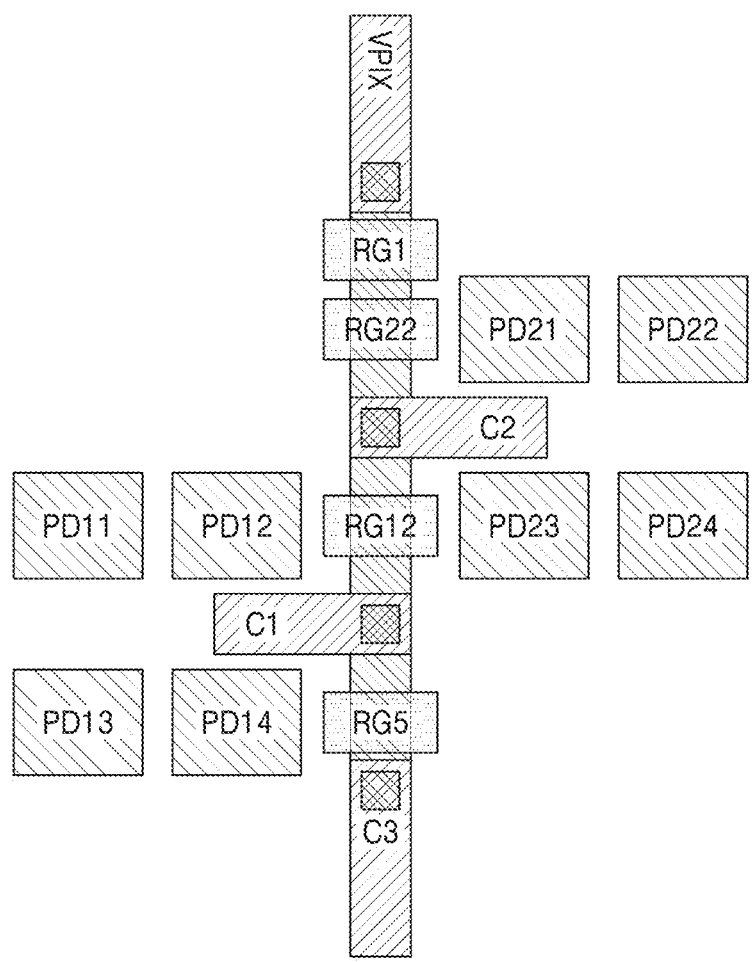

FIGS. 9A and 9B respectively illustrate a circuit diagram in which the first pixel group PG1 and the second pixel group PG2 share transistors and voltage nodes according to some example embodiments. Hereinafter, descriptions previously given above are omitted.

Referring to FIGS. 8A and 9A together, the first node ND1 of the first reset transistor PG1 may further include a fifth reset transistor RG5 connected in parallel. Restated, the fifth reset transistor RG5 may be connected in parallel to the first node ND1. The third capacitor C3 arranged between the shared reset transistor RG1 and in fourth reset transistor RG22 in FIG. 8A may be rearranged to be connected to the fifth reset transistor RG5.

Referring to FIGS. 8B and 9B, since the fifth reset transistor RG5 is added to rearrange the third capacitor C3, four transistors and four metal contacts may be formed in the first pixel group PG1 and the second pixel group PG2.

Figure 10A:
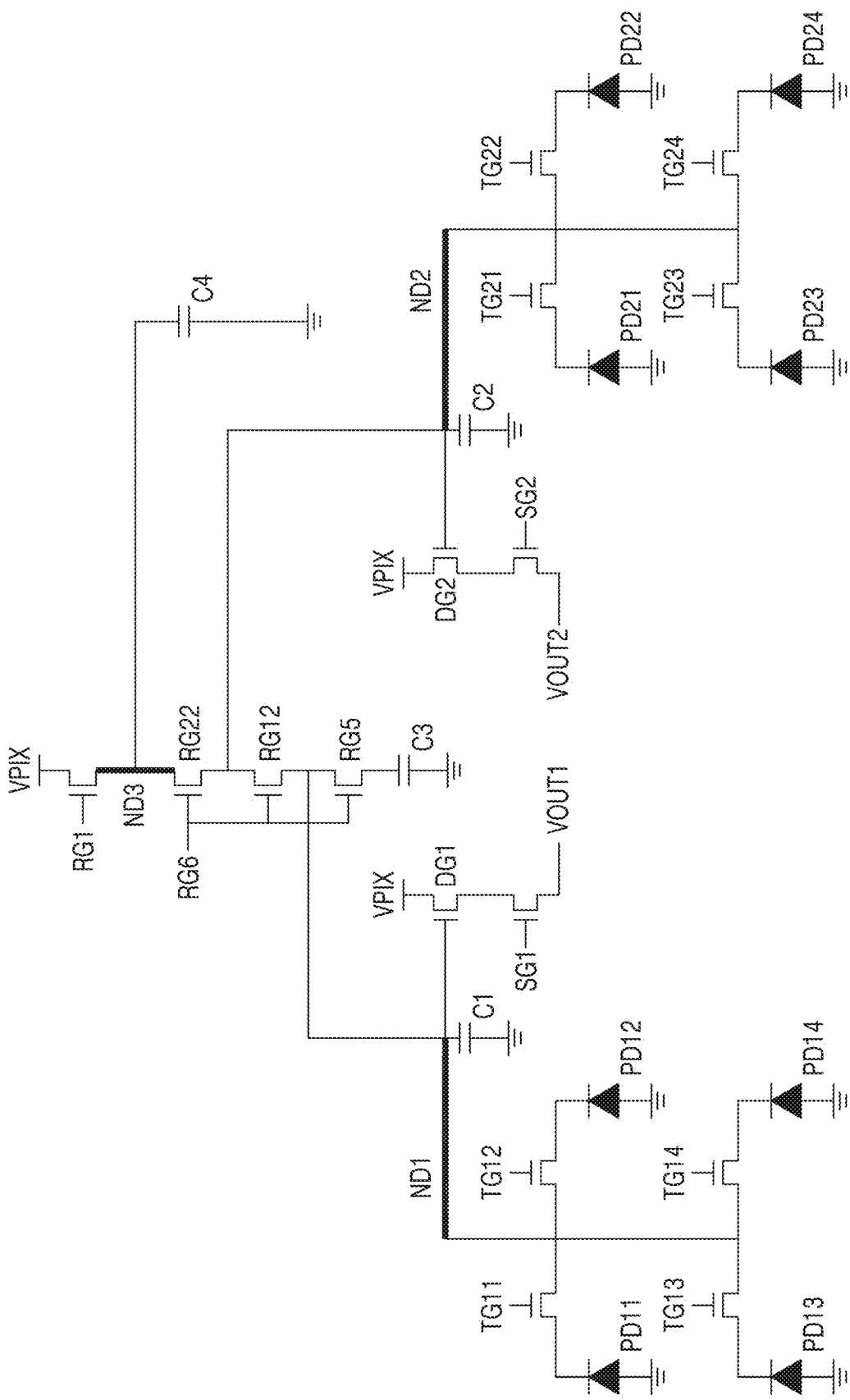
FIGS. 10A and 10B respectively illustrate a circuit diagram and a layout in which an additional capacitor is connected according to some example embodiments of the inventive concepts.
Figure 10B:
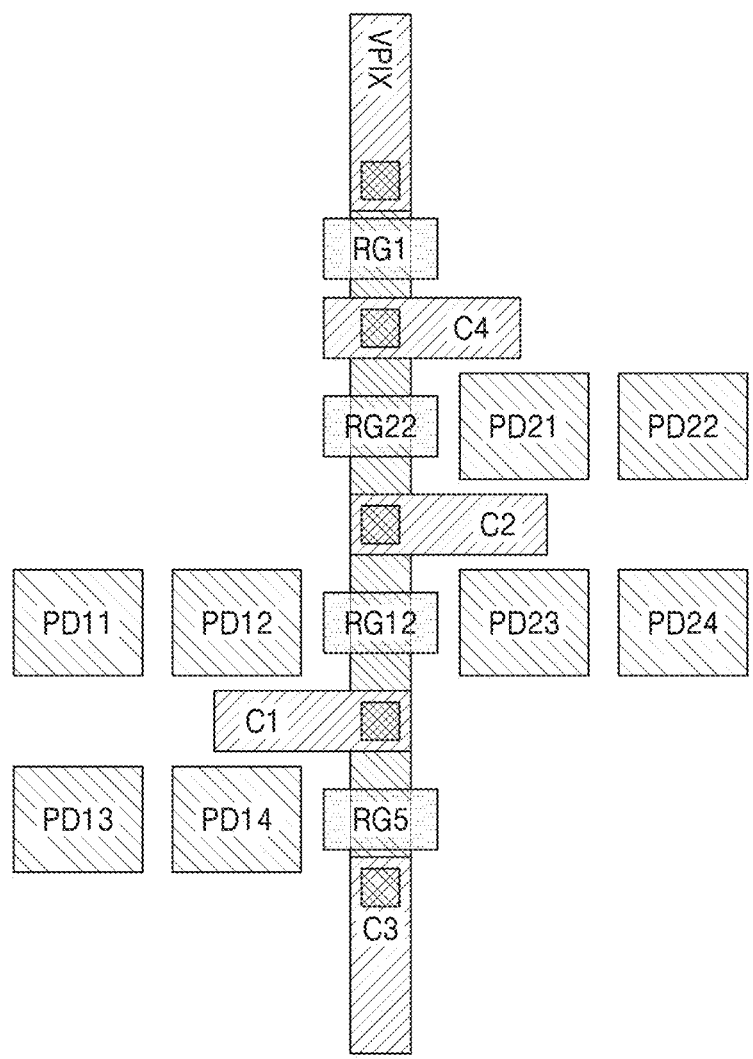

FIGS. 10A and 10B respectively illustrate a circuit diagram and a layout in which an additional capacitor is connected according to some example embodiments. Hereinafter, descriptions previously given above are omitted.

Referring to FIGS. 9A and 10A together, the third node ND3 may further include the third node ND3. In FIG. 9A, the third node ND3 merely electrically connects the shared reset transistor RG1 and the fourth reset transistor RG22 of the second pixel group PG2, but the third node ND3 in FIG. 10A may further include the fourth capacitor C4 connected in parallel. The fifth reset transistor RG5 may be configured to selectively connect the first node ND1 to the fourth capacitor C4.

According to some example embodiments, the image sensor 100 may support the LCG mode with the lower conversion gain. A sum of capacitance viewed from the first node ND1 of the first pixel group PG1 may be equal to a sum of the capacitances of the first capacitor C1 to the fourth capacitor C4. In some example embodiments, the image sensor 100 is configured to turn off the shared reset transistor RG1 and turn on both the second reset transistor RG22 and the fourth reset transistor RG12 to set each of a first conversion gain of the first photo-sensing elements PD11 to PD14 and a second conversion gain of the second photo-sensing elements PD21 to PD24 based on the first capacitor C1, the second capacitor C2, the third capacitor C3, and the fourth capacitor C4. Thereafter, a detailed description with respect to the LCG mode with the lower conversion gain may be replaced with the description of FIG. 7B.

Referring to FIGS. 9B and 10B together, four transistors and five metal contacts may be formed in the first pixel group PG1 and the second pixel group PG2. Comparing with FIG. 9B, one metal contact may be additionally implemented in FIG. 10B. The added metal contact may correspond to a metal contact arranging the fourth capacitor C4 connected in parallel to the third node ND3 between the shared reset transistor RG1 and the fourth reset transistor RG22. According to some example embodiments, the four transistors and the five metal contacts may be connected in series to intersect.

According to the above-mentioned FIGS. 4 to 10B, the transistors and shared reset transistors being between the first pixel group PG1 and the second pixel group PG2 are disclosed in some example embodiments. According to some example embodiments, the DCG may be supported by using fewer transistors and metal contacts between neighboring pixel groups. In addition, the number of transistors and metal contacts is reduced, thereby reducing the layout complexity and increasing the space efficiency. For example, sizes of the driving transistors DG1 and DG2 may be increased by using a space obtained by saving the transistors and metal contacts. When the sizes of the driving transistors DG1 and DG2 are increased, a random telegraph signal (RTS) noise may be improved and random noise may also be improved. In addition, when the sizes of the driving transistors DG1 and DG2 are increased, linearity is increased. As shown in FIGS. 10A-10B, a number (e.g., quantity) of reset transistors between the third capacitor C3 and the pixel voltage node VPIX (e.g., four reset transistors) may be different from a number (e.g., quantity) of reset transistors between the fourth capacitor C4 and the pixel voltage node VPIX (e.g., one reset transistor).

Figure 11:
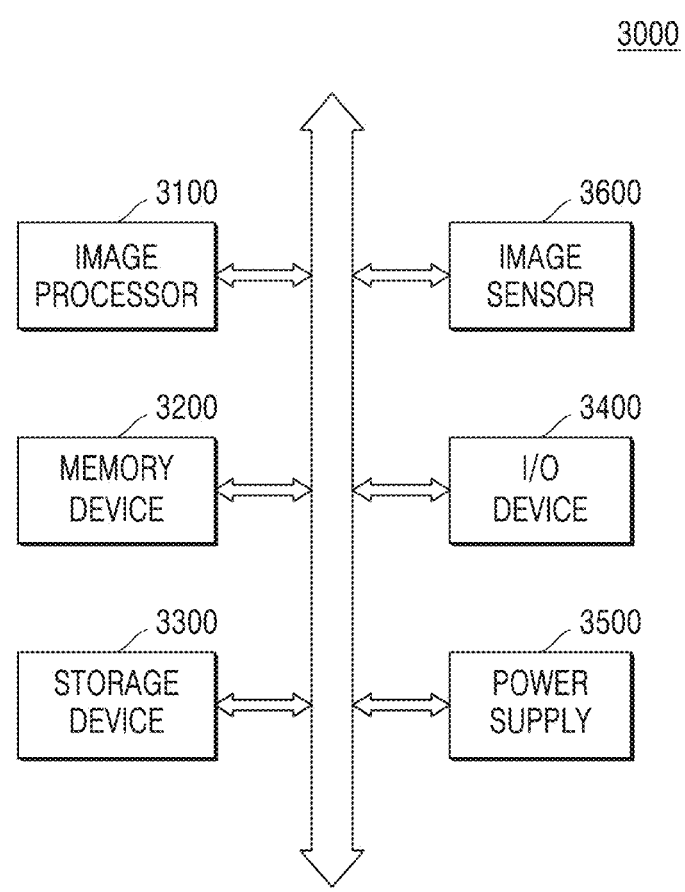
FIG. 11 is a block diagram of a computing system including an image sensor according to some example embodiments of the inventive concepts.

FIG. 11 is a block diagram of a computing system 3000 including an image sensor 3600 according to some example embodiments.

Referring to FIG. 11, the computing system 3000 may include an image processor 3100, a memory device 3200, a storage device 3300, an input/output device 3400, a power supply 3500, and the image sensor 3600. The image sensor 3600 may include the image sensor according to some example embodiments of the inventive concepts described above with reference to FIGS. 1 to 16. Although not illustrated in FIG. 11, the computing system 3000 a port which may communicate with a video card, a sound card, a memory card, a USB device, or the like or may communicate with other electronic devices.

The image processor 3100 may perform certain calculations or tasks. The image processor 3100 may process signals output from the image sensor 3600 according to some example embodiments of the inventive concepts described above with respect to FIGS. 1 to 10B and may control an operation of the image sensor 3600. For example, the image sensor 3600 may determine to operate in the HCG mode or the LCG mode depending on a surrounding luminance. Accordingly, an image having an optimal resolution may be obtained (e.g., generated) irrespective of different illuminant environments. The image processor 3100 may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The memory device 3200 may be a non-transitory computer-readable storage device that may store data necessary for an operation of the computing system 3000. For example, the memory device 3200 may include a dynamic random access memory (DRAM), a mobile DRAM, a static random access memory (SRAM), or a non-volatile memory device. Chips of the memories may be implemented by using various types of packages, either individually or together. For example, the chips may be packaged as a package such as a package on package (PoP), ball grid arrays (BGAs), chip scale packages (CSPs), a plastic leaded chip carrier (PLCC), a plastic dual in-line package (PDIP), a die in waffle pack, a die in wafer form, a chip on board (COB), a ceramic dual in-line package (CERDIP), a plastic metric quad flat pack (MQFP), or the like. In some example embodiments, the memory device 3200 may store a program of instructions and the image processor 3100 may be configured to execute the program of instructions to implement some or all of the functionality of the computing system 3000.

The storage device 3300 may include a solid state drive (SSD), a hard disk drive (HDD), a CD-ROM, or the like. The input/output device 3400 may include input measures and output units, the input measures including a keyboard, a keypad, a mouse, or the like, and the output units including a printer, a display, or the like. The power supply 3500 may supply an operating voltage utilized for an operation of the computing system 3000.

The image sensor 3600 may connect to the image processor 3100 through buses or other communication links to perform communications. The image sensor 3600 may be integrated on one chip together with the image processor 3100 or may be integrated on different chips. Meanwhile, the computing system 3000 should be interpreted as any computing system using an image sensor. For example, the computing system may include a digital camera, a mobile phone, a personal digital assistant (PDA), a portable multimedia player (PMP), a smartphone, a tablet PC, or the like.

As described above, some example embodiments have been disclosed in the drawings and disclosure. Although specific language has been used to describe some example embodiments in the inventive concepts, the specific language is used for the purpose of describing the spirit of the inventive concepts and no limitation of the scope of the inventive concepts as defined by the following claims is intended by this specific language. While the inventive concepts have been particularly shown and described with reference to some example embodiments thereof, it will be understood that various changes in form and details may be made therein without departing from the spirit and scope of the following claims.

What is claimed is:
1. An image sensor, comprising:
a plurality of first photodiodes sharing a first floating diffusion node;
a plurality of second photodiodes sharing a second floating diffusion node;
a common transistor configured to selectively connect a third floating diffusion node to a pixel voltage node;

a first reset transistor configured to selectively connect the first floating diffusion node to the third floating diffusion node;

a second reset transistor configured to selectively connect the second floating diffusion node to the third floating diffusion node;

a first driving transistor, the first driving transistor having a first source node, the first driving transistor having a first gate end that is connected to the first floating diffusion node;

a second driving transistor, the second driving transistor having a second source node, the second driving transistor having a second gate end that is connected to the second floating diffusion node;

a first selection transistor, the first selection transistor having a first drain end that is connected to the first source node of the first driving transistor; and a second selection transistor, the second selection transistor having a second drain end that is connected to the second source node of the second driving transistor.

2. The image sensor of claim 1, wherein the image sensor is configured to turn on the common transistor and turn off both the first reset transistor and the second reset transistor, to set a first conversion gain of the plurality of first photodiodes based on a first capacitance of the first floating diffusion node, and set a second conversion gain of the plurality of second photodiodes based on a second capacitance of the second floating diffusion node.

3. The image sensor of claim 1, wherein the image sensor is configured to turn off the common transistor and turn on both the first reset transistor and the second reset transistor to set each of a first conversion gain of the plurality of first photodiodes and a second conversion gain of the plurality of second photodiodes based on a first capacitance of the first floating diffusion node, a second capacitance of the second floating diffusion node, and a third capacitance of the third floating diffusion node.

4. The image sensor of claim 1, wherein the first reset transistor and the second reset transistor are collectively comprised by one 3-way transistor, the 3-way transistor including three terminals, each terminal of the three terminals directly connected to a separate one of the first floating diffusion node, the second floating diffusion node, and the third floating diffusion node.

5. The image sensor of claim 4, further comprising:
a first metal contact connecting the first floating diffusion node to the 3-way transistor;
a second metal contact connecting the second floating diffusion node to the 3-way transistor;
a third metal contact connecting the third floating diffusion node to the 3-way transistor; and
a fourth metal contact connecting the pixel voltage node to the common transistor,
wherein the first metal contact and the second metal contact are aligned in a horizontal direction,
wherein the third metal contact and the fourth metal contact are aligned in a vertical direction, and
wherein a center of the third metal contact and a center of the fourth metal contact are each formed to have a concave-convex shape isolated from direct contact with a center of the first metal contact and a center of the second metal contact, respectively, in the vertical direction.

6. The image sensor of claim 1, wherein the first reset transistor and the second reset transistor are collectively comprised by one 4-way transistor, the 4-way transistor including four terminals, each terminal of the four terminals directly connected to a separate one of the first floating diffusion node, the second floating diffusion node, the third floating diffusion node, and a first capacitor, the terminal directly connected to the third floating diffusion node further connected to the common transistor via the third floating diffusion node.

7. The image sensor of claim 6, further comprising:
a second capacitor connected in parallel between the 4-way transistor and the common transistor.

8. The image sensor of claim 6, further comprising:
a first metal contact connecting the first floating diffusion node to the 4-way transistor;
a second metal contact connecting the second floating diffusion node to the 4-way transistor;
a third metal contact connecting the third floating diffusion node to the 4-way transistor; and
a fourth metal contact connecting the pixel voltage node to the common transistor,
wherein the first metal contact and the second metal contact are arranged in a horizontal direction,
wherein the third metal contact and the fourth metal contact are arranged in a vertical direction, and
wherein a center of the third metal contact and a center of the fourth metal contact are each formed to have a cross shape in conformity with a center of the first metal contact and a center of the second metal contact, respectively.

9. An image sensor, comprising:
a plurality of first photodiodes sharing a first floating diffusion node;
a plurality of second photodiodes sharing a second floating diffusion node;
a first reset transistor configured to selectively connect the first floating diffusion node to the second floating diffusion node;
a second reset transistor configured to selectively connect the second floating diffusion node to a third floating diffusion node;
a common transistor configured to selectively connect the third floating diffusion node to a pixel voltage node;
a first driving transistor, the first driving transistor having a first source node, the first driving transistor having a first gate end that is connected to the first floating diffusion node;
a second driving transistor, the second driving transistor having a second source node, the second driving transistor having a second gate end that is connected to the second floating diffusion node;
a first selection transistor, the first selection transistor having a first drain end that is connected to the first source node of the first driving transistor; and
a second selection transistor, the second selection transistor having a second drain end that is connected to the second source node of the second driving transistor.

10. The image sensor of claim 9, wherein the image sensor is configured to turn on the common transistor, the first reset transistor, and the second reset transistor to establish an electrical connection in series according to a sequence of the pixel voltage node, the third floating diffusion node, the second floating diffusion node, and the first floating diffusion node.

11. The image sensor of claim 9, wherein, a quantity of reset transistors between the first floating diffusion node and the pixel voltage node is different from a quantity of reset transistors between the second floating diffusion node and the pixel voltage node.

12. The image sensor of claim 9, further comprising:
a third reset transistor connected in parallel to the first floating diffusion node,
wherein a capacitor is connected to the third reset transistor.

13. The image sensor of claim 9, further comprising:
a third reset transistor connected in parallel to the first floating diffusion node; and
a capacitor,
wherein the third reset transistor is configured to selectively connect the first floating diffusion node to the capacitor.

14. The image sensor of claim 13, wherein the image sensor is configured to turn off the common transistor and turn on both the first reset transistor and the third reset transistor, to set each of a first conversion gain of the plurality of first photodiodes and a second conversion gain of the plurality of second photodiodes based on a first capacitance of the first floating diffusion node, a second capacitance of the second floating diffusion node, a third capacitance of the third floating diffusion node, and the capacitor.

15. The image sensor of claim 13, wherein a quantity of reset transistors between the third floating diffusion node and the pixel voltage node is different from a number of reset transistors between the capacitor and the pixel voltage node.

16. The image sensor of claim 9, wherein
each first photodiode of the plurality of first photodiodes includes a first color filter configured to selectively transmit light associated with a first color,
each second photodiode of the plurality of second photodiodes includes a second color filter configured to selectively transmit light associated with a second color, and
the first color is different from the second color.

17. An electronic device, comprising:
an image sensor, the image sensor including
a plurality of first photodiodes sharing a first floating diffusion node;
a plurality of second photodiodes sharing a second floating diffusion node;
a common transistor configured to selectively connect a third floating diffusion node to a pixel voltage node;
a first reset transistor configured to selectively connect the first floating diffusion node to the third floating diffusion node; and
a second reset transistor configured to selectively connect the second floating diffusion node to the third floating diffusion node;
a first driving transistor, the first driving transistor having a first source node, the first driving transistor having a first gate end that is connected to the first floating diffusion node;
a second driving transistor, the second driving transistor having a second source node, the second driving transistor having a second gate end that is connected to the second floating diffusion node;
a first selection transistor, the first selection transistor having a first drain end that is connected to the first source node of the first driving transistor; and
a second selection transistor, the second selection transistor having a second drain end that is connected to the second source node of the second driving transistor.

18. The electronic device of claim 17, wherein the first reset transistor and the second reset transistor are collectively comprised by one 3-way transistor, the 3-way transistor including three terminals, each terminal of the three terminals directly connected to a separate one of the first floating diffusion node, the second floating diffusion node, and the third floating diffusion node.

19. The electronic device of claim 17, wherein the first reset transistor and the second reset transistor are collectively comprised by one 4-way transistor, the 4-way transistor including four terminals, each terminal of the four terminals directly connected to a separate one of the first floating diffusion node, the second floating diffusion node, the third floating diffusion node, and a first capacitor, the terminal directly connected to the third floating diffusion node further connected to the common transistor via the third floating diffusion node.

20. The electronic device of claim 19, the image sensor further comprising:
a second capacitor connected in parallel between the 4-way transistor and the common transistor.

* * * * *